(12) United States Patent
Artusi et al.

(10) Patent No.: US 7,675,759 B2
(45) Date of Patent: Mar. 9, 2010

(54) POWER SYSTEM WITH POWER CONVERTERS HAVING AN ADAPTIVE CONTROLLER

(75) Inventors: Daniel A. Artusi, Austin, TX (US); Ross Fosler, Buda, TX (US); Allen F. Rozman, Murphy, TX (US)

(73) Assignee: Flextronics International USA, Inc., San Jose, CA (US)

( * ) Notice: Subject to any disclaimer, the term of this patent is extended or adjusted under 35 U.S.C. 154(b) by 248 days.

(21) Appl. No.: 11/710,276

(22) Filed: Feb. 23, 2007

(65) Prior Publication Data

US 2008/0130322 A1    Jun. 5, 2008

Related U.S. Application Data

(63) Continuation-in-part of application No. 11/607,325, filed on Dec. 1, 2006.

(51) Int. Cl.
*H02M 3/335* (2006.01)
(52) U.S. Cl. .................................. 363/21.01
(58) Field of Classification Search ............ 363/35, 363/37, 40, 41, 47, 48, 95, 97, 131, 132, 363/21.01; 323/355, 362
See application file for complete search history.

(56) References Cited

U.S. PATENT DOCUMENTS

| | | | |
|---|---|---|---|
| 1,376,978 A | 5/1921 | Stoekle | |
| 3,358,210 A | 12/1967 | Grossoehme | |
| 3,433,998 A | 3/1969 | Woelber | |
| 3,553,620 A | 1/1971 | Cielo et al. | |
| 3,622,868 A | 11/1971 | Todt | |

(Continued)

FOREIGN PATENT DOCUMENTS

JP    3-215911    9/1991

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16. No. 6, IEEE, Los Alamitos, CA.

(Continued)

*Primary Examiner*—Adolf Berhane
*Assistant Examiner*—Yemane Mehari
(74) *Attorney, Agent, or Firm*—Slater & Matsil, L.L.P.

(57) ABSTRACT

A power system having a power converter with an adaptive controller. The power system is coupled to a load and includes a power system controller that receives a signal indicating a system operational state of the load and selects a power converter operational state as a function thereof. The power system also includes a power converter with a power switch that conducts for a duty cycle to provide a regulated output characteristic at an output thereof. The power converter also includes a controller that receives a command from the power system controller to enter the power converter operational state and provides a signal to control the duty cycle of the power switch as a function of the output characteristic and in accordance with the command, thereby regulating an internal operating characteristic of the power converter to improve an operating efficiency thereof as a function of the system operational state.

20 Claims, 9 Drawing Sheets

U.S. PATENT DOCUMENTS

| | | | |
|---|---|---|---|
| 3,681,679 A | 8/1972 | Chung | |
| 3,708,744 A | 1/1973 | Stephens at el. | |
| 4,019,122 A | 4/1977 | Ryan | |
| 4,075,547 A | 2/1978 | Wroblewski | |
| 4,327,348 A | 4/1982 | Hirayama | |
| 4,471,423 A | 9/1984 | Hase | |
| 4,499,481 A | 2/1985 | Greene | |
| 4,570,174 A | 2/1986 | Huang et al. | |
| 4,577,268 A | 3/1986 | Easter et al. | |
| 4,581,691 A | 4/1986 | Hock | |
| 4,636,823 A | 1/1987 | Margalit et al. | |
| 4,660,136 A | 4/1987 | Montorefano | |
| 4,803,609 A | 2/1989 | Gillett et al. | |
| 4,823,249 A | 4/1989 | Garcia, II | |
| 4,887,061 A | 12/1989 | Matsumura | |
| 4,899,271 A | 2/1990 | Seiersen | |
| 4,903,089 A | 2/1990 | Hollis et al. | |
| 4,922,400 A | 5/1990 | Cook | |
| 4,999,759 A | 3/1991 | Cavagnolo et al. | |
| 5,003,277 A | 3/1991 | Sokai et al. | |
| 5,027,264 A | 6/1991 | DeDoncker et al. | |
| 5,068,756 A | 11/1991 | Morris et al. | |
| 5,106,778 A | 4/1992 | Hollis et al. | |
| 5,126,714 A | 6/1992 | Johnson | |
| 5,132,888 A | 7/1992 | Lo et al. | |
| 5,134,771 A | 8/1992 | Lee et al. | |
| 5,177,460 A | 1/1993 | Dhyanchand et al. | |
| 5,182,535 A | 1/1993 | Dhyanchand | |
| 5,206,621 A | 4/1993 | Yerman | |
| 5,223,449 A | 6/1993 | Morris et al. | |
| 5,231,037 A | 7/1993 | Yuan et al. | |
| 5,244,829 A | 9/1993 | Kim | |
| 5,291,382 A | 3/1994 | Cohen | |
| 5,305,191 A | 4/1994 | Loftus, Jr. | |
| 5,335,163 A | 8/1994 | Seiersen | |
| 5,336,985 A | 8/1994 | McKenzie | |
| 5,342,795 A | 8/1994 | Yuan et al. | |
| 5,353,001 A | 10/1994 | Meinel et al. | |
| 5,369,042 A | 11/1994 | Morris et al. | |
| 5,374,887 A | 12/1994 | Drobnik | |
| 5,399,968 A | 3/1995 | Sheppard et al. | |
| 5,407,842 A | 4/1995 | Morris et al. | |
| 5,468,661 A | 11/1995 | Yuan et al. | |
| 5,508,903 A | 4/1996 | Alexndrov | |
| 5,554,561 A | 9/1996 | Plumton | |
| 5,555,494 A | 9/1996 | Morris | |
| 5,610,085 A | 3/1997 | Yuan et al. | |
| 5,624,860 A | 4/1997 | Plumton et al. | |
| 5,663,876 A | 9/1997 | Newton et al. | |
| 5,700,703 A | 12/1997 | Huang et al. | |
| 5,712,189 A | 1/1998 | Plumton et al. | |
| 5,719,544 A | 2/1998 | Vinciarelli et al. | |
| 5,734,564 A | 3/1998 | Brkovic | |
| 5,736,842 A | 4/1998 | Jovanovic | |
| 5,742,491 A | 4/1998 | Bowman et al. | |
| 5,747,842 A | 5/1998 | Plumton | |
| 5,756,375 A | 5/1998 | Celii et al. | |
| 5,760,671 A | 6/1998 | Lahr et al. | |
| 5,783,984 A | 7/1998 | Keuneke | |
| 5,784,266 A | 7/1998 | Chen | |
| 5,804,943 A | 9/1998 | Kollman et al. | |
| 5,815,386 A | 9/1998 | Gordon | |
| 5,870,299 A | 2/1999 | Rozman | |
| 5,886,508 A | 3/1999 | Jutras | |
| 5,889,298 A | 3/1999 | Plumton et al. | |
| 5,889,660 A | 3/1999 | Taranowski et al. | |
| 5,909,110 A | 6/1999 | Yuan et al. | |
| 5,910,665 A | 6/1999 | Plumton et al. | |
| 5,920,475 A | 7/1999 | Boylan et al. | |
| 5,925,088 A | 7/1999 | Nasu | |
| 5,933,338 A | 8/1999 | Wallace | |
| 5,940,287 A | 8/1999 | Brkovic | |
| 5,956,245 A | 9/1999 | Rozman | |
| 5,956,578 A | 9/1999 | Weitzel et al. | |
| 5,999,066 A | 12/1999 | Saito et al. | |
| 6,008,519 A | 12/1999 | Yuan et al. | |
| 6,011,703 A | 1/2000 | Boylan et al. | |
| 6,038,154 A | 3/2000 | Boylan et al. | |
| 6,067,237 A | 5/2000 | Nguyen | |
| 6,069,799 A | 5/2000 | Bowman et al. | |
| 6,084,792 A | 7/2000 | Chen et al. | |
| 6,094,038 A | 7/2000 | Lethellier | |
| 6,097,046 A | 8/2000 | Plumton | |
| 6,147,886 A | 11/2000 | Wittenbreder | |
| 6,156,611 A | 12/2000 | Lan et al. | |
| 6,163,466 A | 12/2000 | Davila, Jr. et al. | |
| 6,181,231 B1 | 1/2001 | Bartilson | |
| 6,188,586 B1 | 2/2001 | Farrington et al. | |
| 6,191,964 B1 | 2/2001 | Boylan et al. | |
| 6,208,535 B1 | 3/2001 | Parks | |
| 6,215,290 B1 | 4/2001 | Yang et al. | |
| 6,218,891 B1 | 4/2001 | Lotfi et al. | |
| 6,229,197 B1 | 5/2001 | Plumton et al. | |
| 6,262,564 B1 | 7/2001 | Kanamori | |
| 6,309,918 B1 | 10/2001 | Huang et al. | |
| 6,320,490 B1 | 11/2001 | Clayton | |
| 6,323,090 B1 | 11/2001 | Zommer | |
| 6,348,848 B1 | 2/2002 | Herbert | |
| 6,351,396 B1 | 2/2002 | Jacobs | |
| 6,356,462 B1 | 3/2002 | Jang et al. | |
| 6,362,986 B1 | 3/2002 | Schultz et al. | |
| 6,380,836 B2 | 4/2002 | Matsumoto et al. | |
| 6,388,898 B1 | 5/2002 | Fan et al. | |
| 6,392,902 B1 | 5/2002 | Jang et al. | |
| 6,414,578 B1 | 7/2002 | Jitaru | |
| 6,477,065 B2 | 11/2002 | Parks | |
| 6,483,724 B1 | 11/2002 | Blair et al. | |
| 6,489,754 B2 | 12/2002 | Blom | |
| 6,498,367 B1 | 12/2002 | Chang et al. | |
| 6,501,193 B1 | 12/2002 | Krugly | |
| 6,512,352 B2 | 1/2003 | Qian | |
| 6,525,603 B1 | 2/2003 | Morgan | |
| 6,539,299 B2 | 3/2003 | Chatfield et al. | |
| 6,545,453 B2 | 4/2003 | Glinkowski et al. | |
| 6,549,436 B1 | 4/2003 | Sun | |
| 6,661,276 B1 | 12/2003 | Chang | |
| 6,683,797 B2 | 1/2004 | Zaitsu et al. | |
| 6,696,910 B2 | 2/2004 | Nuytkens et al. | |
| 6,731,486 B2 | 5/2004 | Holt et al. | |
| 6,741,099 B1 | 5/2004 | Krugly | |
| 6,753,723 B2 | 6/2004 | Zhang | |
| 6,765,810 B2 | 7/2004 | Perry | |
| 6,775,159 B2 | 8/2004 | Webb et al. | |
| 6,867,678 B2 | 3/2005 | Yang | |
| 6,873,237 B2 | 3/2005 | Chandrasekaran et al. | |
| 6,944,033 B1 | 9/2005 | Xu et al. | |
| 6,980,077 B1 | 12/2005 | Chandrasekaran et al. | |
| 6,982,887 B2 | 1/2006 | Batarseh et al. | |
| 7,012,414 B1 | 3/2006 | Mehrotra et al. | |
| 7,034,586 B2 | 4/2006 | Mehas et al. | |
| 7,034,647 B2 | 4/2006 | Yan et al. | |
| 7,046,523 B2 | 5/2006 | Sun et al. | |
| 7,061,358 B1 | 6/2006 | Yang | |
| 7,076,360 B1 | 7/2006 | Ma | |
| 7,176,662 B2 | 2/2007 | Chandrasekaran | |
| 7,280,026 B2 | 10/2007 | Chandrasekaran et al. | |
| 7,285,807 B2 | 10/2007 | Brar et al. | |
| 7,298,118 B2 | 11/2007 | Chandrasekaran | |
| 7,321,283 B2 | 1/2008 | Mehrotra et al. | |
| 7,332,992 B2 | 2/2008 | Iwai | |
| 7,339,208 B2 | 3/2008 | Brar et al. | |
| 7,385,375 B2 | 6/2008 | Rozman | |
| 7,417,875 B2 | 8/2008 | Chandrasekaran et al. | |
| 7,427,910 B2 | 9/2008 | Mehrotra et al. | |

| | | | |
|---|---|---|---|
| 2002/0114172 | A1 | 8/2002 | Webb et al. |
| 2003/0197585 | A1 | 10/2003 | Chandrasekaran et al. |
| 2003/0198067 | A1 | 10/2003 | Sun et al. |
| 2004/0017689 | A1 | 1/2004 | Zhang et al. |
| 2004/0034555 | A1 | 2/2004 | Dismukes et al. |
| 2004/0148047 | A1 | 7/2004 | Dismukes et al. |
| 2004/0156220 | A1* | 8/2004 | Kim et al. ............. 363/97 |
| 2005/0024179 | A1 | 2/2005 | Chandrasekaran et al. |
| 2005/0245658 | A1 | 11/2005 | Mehrotra et al. |
| 2005/0281058 | A1* | 12/2005 | Batarseh et al. .......... 363/16 |
| 2006/0038549 | A1 | 2/2006 | Mehrotra et al. |
| 2006/0038649 | A1 | 2/2006 | Mehrotra et al. |
| 2006/0038650 | A1 | 2/2006 | Mehrotra et al. |
| 2006/0187684 | A1 | 8/2006 | Chandrasekaran et al. |
| 2006/0197510 | A1 | 9/2006 | Chandrasekaran |
| 2006/0198173 | A1 | 9/2006 | Rozman |
| 2006/0226477 | A1 | 10/2006 | Brar et al. |
| 2006/0226478 | A1 | 10/2006 | Brar et al. |
| 2006/0237968 | A1 | 10/2006 | Chandrasekaran |
| 2006/0255360 | A1 | 11/2006 | Brar et al. |
| 2007/0045765 | A1 | 3/2007 | Brar et al. |
| 2007/0069286 | A1 | 3/2007 | Brar et al. |
| 2007/0114979 | A1 | 5/2007 | Chandrasekaran |
| 2007/0222463 | A1* | 9/2007 | Qahouq et al. .......... 324/712 |
| 2007/0296028 | A1 | 12/2007 | Brar et al. |
| 2007/0298559 | A1 | 12/2007 | Brar et al. |
| 2007/0298564 | A1 | 12/2007 | Brar et al. |
| 2008/0024259 | A1 | 1/2008 | Chandrasekaran et al. |
| 2008/0054874 | A1* | 3/2008 | Chandrasekaran et al. .. 323/362 |
| 2008/0130321 | A1* | 6/2008 | Artusi et al. ........... 363/21.01 |
| 2008/0130322 | A1* | 6/2008 | Artusi et al. ........... 363/21.01 |
| 2008/0232141 | A1* | 9/2008 | Artusi et al. ........... 363/21.01 |
| 2008/0315852 | A1 | 12/2008 | Jayaraman et al. |
| 2008/0316779 | A1 | 12/2008 | Jayaraman et al. |

FOREIGN PATENT DOCUMENTS

JP          2000-68132        3/2000

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.
"AN101A; Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with integrated Magnetics," Proceedings of 1997 IEEE Applied Power Electronics Conference (APEC '97), 1997, pp. 911-917, IEEE, Los Alamitos, CA.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Jitaru, I.O., et al., "Quasi-Integrated Magnetic An Avenue for Higher Power Density and Efficiency in Power Converters," Twelfth Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE Eleventh Annual Applied Power Electronics Conference and Exposition, Mar. 1996, pp. 254-269, vol. 1, IEEE.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Liu, W., "Fundamentals of III-V Devices: HBTs, MESFETs, and HFETs/HEMTs," §5-5: Modulation Doping, 1999, pp. 323-330, John Wiley & Sons, New York, NY.
Miwa, B.A., et al., "High Efficiency Power Factor Correction Using Interleaving Techniques," IEEE Proceedings of APEC, 1992, pp. 557-568, IEEE, Los Alamitos, CA.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual, IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," Proceedings of INTELEC '98, 1998, 9 pp., Paper 2-3, IEEE, Los Alamitos, CA.
Plumton, D.L., et al., "A Low On-Resistance High-Current GaAs Power VFET," IEEE Electron Device Letters, Apr. 1995. pp. 142-144, vol. 16, No. 4, IEEE.
Rajeev, M., "An Input Current Shaper with Boost and Flyback Converter Using Integrated Magnetics," Power Electronics and Drive Systems, Fifth International Conference on Power Electronics and Drive Systems 2003, Nov. 17-20, 2003, pp. 327-331, vol. 1, IEEE, Los Alamitos, CA.
Severns. R., "Circuit Reinvention in Power Electronics and Identification of Prior Work," Proceedings of 1997 IEEE Applied Power Electronics Conference (APEC '97), 1997, pp. 3-9, IEEE, Los Alamitos. CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Thaker, M., et al., "Adaptive/Intelligent Control and Power Management Reduce Power Dissipation and Consumption." Digital Power Forum '06, 11 pp., Sep. 2006, Darnell Group, Richardson, TX.
Weitzel, C.E., "RF Power Devices for Wireless Communications," 2002 IEEE MTT-S CDROM, 2002, pp. 285-288, paper TU4B-1, IEEE., Los Alamitos, CA.
Williams, R., "Modern GaAs Processing Methods," 1990, pp. 66-67, Artech House, Inc., Norwood, MA.
Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.
Xu. P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Zhou. X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Match 1998, pp. 145-150, IEEE, Los Alamitos, CA.

Lenk, R., "Introduction to the Tapped Buck Converter," PCIM 2000, HFPC 2000 Proceedings, Oct. 2000, pp. 155-166.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Wei, J., et al., "Comparison of Three Topology Candidates for 12V VRM," IEEE APEC, 2001, pp. 245-251, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

* cited by examiner

POWER SYSTEM WITH POWER CONVERTERS HAVING AN ADAPTIVE CONTROLLER

This application is a continuation in part of, and claims priority to, U.S. patent application Ser. No. 11/607,325, entitled "Power Converter with an Adaptive Controller and Method of Operating the Same," filed on Dec. 1, 2006, which application is incorporated herein by reference.

TECHNICAL FIELD

The present invention is directed, in general, to electronic power conversion and, more specifically, to a power system having power converters including a controller adapted to improve power conversion efficiency and method of operating the same.

BACKGROUND

A switch-mode power converter (also referred to as a "power converter") is a power supply or power processing circuit that converts an input voltage waveform into a specified output voltage waveform. Controllers associated with the power converters manage an operation thereof by controlling the conduction periods of power switches employed therein. Generally, the controllers are coupled between an input and output of the power converter in a feedback loop configuration.

Typically, the controller measures an internal operating characteristic (e.g., an internal bus voltage) or an output characteristic, (e.g., an output voltage or an output current) representing an operating condition of the power converter, and based thereon modifies a duty cycle of a power switch or power switches of the power converter to regulate the internal operating characteristic or the output characteristic. The duty cycle is a ratio represented by a conduction period of a power switch to a switching period thereof. Thus, if a power switch conducts for half of the switching period, the duty cycle for the power switch would be 0.5 (or 50 percent). Additionally, as the needs for systems such as a microprocessor powered by the power converter dynamically change (e.g., as a computational load on the microprocessor changes), the controller should be configured to dynamically increase or decrease the duty cycle of the power switches therein to regulate the internal or the output characteristic at a desired value. In an exemplary application, the power converters have the capability to convert an unregulated dc input voltage such as five volts to a lower, regulated, dc output voltage such as 2.5 volts to power a load. In another exemplary application, the power converters have the capability to convert an unregulated ac input voltage such as 120 volts to a regulated internal dc bus voltage, such as 300 volts dc, and to further convert the regulated internal dc bus voltage into a dc output voltage such as 2.5 volts to power a load.

An important consideration for the design of a power converter and its controller is the efficiency (also referred to as "operating efficiency") in a particular application, and under particular operating conditions. The efficiency of a power converter is the ratio of its output power to its input power. The practical efficiency of a power converter that delivers at least half its rated output power to a load is typically 80 to 90%. As load current is reduced, the operating efficiency correspondingly goes down. In the limiting case wherein the load current approaches a small percentage of the maximum rated current of the power converter, the operating efficiency approaches zero due to the need to provide power for fixed internal loads such as the controller itself, for drivers, for internal high-frequency power switches, and for inherently dissipative circuit elements such as the magnetic core of a high-frequency transformer. Power converter efficiency is accordingly dependent on an internal operating characteristic of the power converter or an output characteristic thereof. Examples of an internal operating characteristic include a temperature of a component part, an internal bus voltage, the voltage level of a drive signal for a power switch, the number of paralleled power switches selectively enabled to conduct, the number of phases enabled on a power converter, or even the basic switching frequency of the power converter. Examples of an output characteristic include a load current drawn from the power converter and an output voltage. Power converter efficiency is also dependent on a parameter that may be measured after a manufacturing step, which may reflect a dependency of efficiency on particular parts used to manufacture the power converter in question.

Operating efficiency is an important quality indicator for a power converter because of the broad impact efficiency has on equipment reliability and size, operating expense, and corresponding effects on the load equipment that it powers. Thus, system considerations of achieving high operating efficiency have immediate effects on the applicability of a particular power converter design, and the associated price thereof in the marketplace.

Numerous prior art attempts have been made to improve the operating efficiency of a power converter. Most attempts have focused on selection of proper components to provide the maximum operating efficiency for average operating conditions at a chosen operating point, such as a load current at three quarters of a maximum rated value, the environmental temperature at a typical expected value, and for a typical mix of actual components employed to manufacture a particular power converter unit. Recognizing the wide range of possible values for any of these parameters, there is substantial remaining opportunity to improve the efficiency of a power converter for a particular operating condition.

An example of the prior art to provide high power converter efficiency at a particular operating condition is provided in U.S. Pat. No. 6,351,396, entitled "Method and Apparatus for Dynamically Altering Operation of a Converter Device to Improve Conversion Efficiency," to Jacobs, issued Feb. 26, 2002 which is incorporated herein by reference. Jacobs is directed to a search process that varies parameters accessible to the controller during power converter operation, such as a timing delay between conduction intervals of the power switches, and observes the resulting effect on the duty cycle. The duty cycle is employed as an indicator of operating efficiency, and parameters accessible to the controller are adjusted to produce an extremum in the duty cycle for a particular operating condition, thereby increasing the operating efficiency of the power converter. While Jacobs performs efficiency optimization under actual operating conditions, the reference nonetheless fails to consider constraints of the actual application (such as described in a requirements document or operating specification document) or the environment during execution of the process of efficiency optimization, or a signal from an external source to enable, limit, or alter the optimization process. For example, no attempt is made to measure a parameter of a particular power converter unit after a manufacturing step (or to measure a parameter of a representative power converter unit), or to control, program, or otherwise alter a response of the controller to reflect such measurement, such as by controlling an internal operating characteristic or an output characteristic.

Another attempt to adaptively operate a power converter to improve efficiency is described in U.S. Pat. No. 5,742,491, entitled "Power Converter Adaptively Driven," to Bowman, et al. ("Bowman"), issued Apr. 21, 1998, which is incorporated herein by reference. Bowman is directed to a drive circuit for a power converter wherein the timing of conduction intervals for the power switches is programmed to increase the efficiency of the power converter while keeping stresses on individual components within acceptable limits. A predetermined delay between drive waveforms supplied to the power switches and to the synchronous rectifiers of the power converter is altered with a predetermined program that is a function of an operating condition of the power converter to allow the power converter to operate efficiently in an anticipated operating environment and with anticipated component realizations. A design objective is to desensitize the operating efficiency to an expected range of changes in the operating environment and with an anticipated range of component realizations, which results in a compromise in a static program to optimize efficiency that might otherwise be achievable with the design of an improved controller not so limited. Bowman relies on a limited set of a priori conditions, and does not adjust controller parameters in response to a measured power converter parameter for the particular power converter unit after a manufacturing step, or to a measured parameter of a representative power converter unit (e.g., from a group of manufactured units), or in response to a signal from an external source representing an environmental parameter.

A further attempt to optimize power conversion efficiency is described in U.S. Pat. No. 5,734,564, entitled "High-Efficiency Switching Power Converter," to Brkovic, issued Mar. 31, 1998, which is incorporated herein by reference. Brkovic describes measuring an internal operating characteristic of a power train of the power converter (i.e., a voltage across a power switch) and adjusting a timing of a duty cycle for the power switch in response to the measured power switch voltage to improve power conversion efficiency. Brkovic provides a preconditioned response to a measured parameter of the particular power converter unit after a manufacturing step. Brkovic does not consider adapting or constraining the response to a signal from an external source representing an environmental parameter.

It is well known in the art to couple an input control signal to a power converter to control the setpoint of an output characteristic thereof. For example, the output voltage of a power converter adapted to supply power to a microprocessor load (wherein the operating voltage thereof is not known at the time of manufacture, or that is changed during normal operation such as when a microprocessor enters a sleep mode) can be statically or dynamically altered by an input control signal. However, this control mechanism merely changes a setpoint for an output characteristic of the power converter, and is not adapted to optimize the efficiency of the power converter at the signaled setpoint.

It should also be taken into account that there are loads with different operating states. For example, a server configured to process financial data may operate at a higher level of criticality during normal business hours, and revert to a lower processing state at another time of day. The aforementioned system may require a higher level of performance from the power converter during such periods of high criticality, which may compromise operating efficiency, but which may admit higher operating efficiency during substantial periods of time in the lower processing state.

Power conversion systems of the prior art have only partially responded to such system operational state considerations in the optimization of operating efficiency, particularly at a system level. For example, the advanced configuration and power interface ("ACPI") specification is an open industry standard initially produced in December 1996 that describes "P-states" and "C-states" of a processor employed in a digital system, and which is incorporated herein by reference. The P-state, typically designated as P-states P0, P1, and P2, describes the "performance" state (or, alternatively, the "power" state) of the processor as high, medium, or low, respectively, for example, as described by Alon Naveh, et al., in the article entitled "Power and Thermal Management in the Intel® Core Duo™ Processor, Intel Technology Journal, May 15, 2006, pp. 109-121, which is incorporated herein by reference. The P-state is selected by the software operating system to meet the execution needs of the software load as observed over a period of time. A particular P-state is affected by setting, from a set of predetermined values from a list, the core input voltage of the processor and its clock rate. The processor core input voltage is adjusted by sending a digital signal such as a "VID" code to the processor's point-of-load voltage source. A processor operating at a lower core voltage and with a slower clock operates at a substantially lower power level.

Another processor state indicator, the core state ("C-state"), also under software operating system control, affects its level of power consumption from another perspective. The highest processor C-state, C0, describes a processor at its full operational level. Lower C-state levels, C1, C2, . . . C4, describe various levels of a processor sleep state. C-state level C1 provides the minimum level of power saving, but provides the fastest response time back to the full operational level C-state level C0. C-state level C4 provides a "deep sleep" level, but requires substantial time for the processor to return to normal operation. The various sleep levels are achieved by halting instruction execution, gating internal clocks, disabling internal phase-locked loops, and disabling ports that respond to certain levels of interrupts. The minimum core voltage is applied necessary to retain certain volatile memory elements.

Although these state indicators have been used to substantially reduce the energy requirement of a digital system at the system level, particularly the power level during an idling state, corresponding states have not been described for elements of the power system as it responds to the various operational levels of the load, such as a request for a particular load voltage, or a particular level of system readiness, or the response time for changes in a system operational level. Accordingly, opportunities for further improvement in power converter operational efficiency have not been realized.

Thus, attempts have been made in the prior art to configure power converter controllers to statically optimize power conversion efficiency of a power train. The static responses have included varying an internal operating characteristic of the power converter with a fixed program in response to a measured characteristic such as a load current to improve power conversion efficiency, or in response to observed changes in power converter duty cycle. The aforementioned attempts to improve efficiency have been facilitated by inclusion of programmable digital devices such as microprocessors, digital signal processors, application specific integrated circuits, and field-programmable gate arrays in the controller. Nonetheless, the responses of a controller have not included consideration of a measured parameter after a manufacturing step for the particular power converter unit that is being controlled such as a measurement of an actual delay of a particular power switch or an internal circuit after completion of a stage of manufacture, or a signal indicating a system operational state.

Considering limitations as described above, a controller for a power converter is presently not available for the more severe applications that lie ahead that depend on achieving higher operating efficiency for a particular operating characteristic constrained or controlled by an environmental parameter. In addition, a controller for a power converter is presently not available that responds to a parameter measured after a manufacturing step for the particular power converter unit, or to a parameter measured after a manufacturing step on a representative power converter unit, or on power converter units in a representative run, to improve the operating efficiency thereof. A controller for a power converter is also presently not available that responds to a signal indicating a system operational state to improve operating efficiency at a system level.

Accordingly, what is needed in the art is a controller for a power converter and power system that adaptively improves power conversion efficiency of a power converter in response to a measured parameter of the power converter after a manufacturing step, or to a parameter measured on a representative power converter unit, and includes consideration of operating conditions, a signal from an external source representing an environmental parameter or system operational state of a load coupled to the power system. In accordance therewith, a controller for a power converter and power system is provided that adaptively improves power conversion efficiency, including the considerations as provided herein.

SUMMARY OF THE INVENTION

These and other problems are generally solved or circumvented, and technical advantages are generally achieved, by advantageous embodiments of the present invention, which include a power system having a power converter with an adaptive controller and method of operating the same. In one embodiment, the power system is coupled to a load and includes a power system controller configured to receive a signal indicating a system operational state of the load and select a power converter operational state as a function thereof. The power system also includes a power converter with a power switch configured to conduct for a duty cycle to provide a regulated output characteristic at an output thereof. The power converter also includes a controller configured to receive a command from the power system controller to enter the power converter operational state and provide a signal to control the duty cycle of the power switch as a function of the output characteristic and in accordance with the command, thereby regulating an internal operating characteristic of the power converter to improve an operating efficiency thereof as a function of the system operational state.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
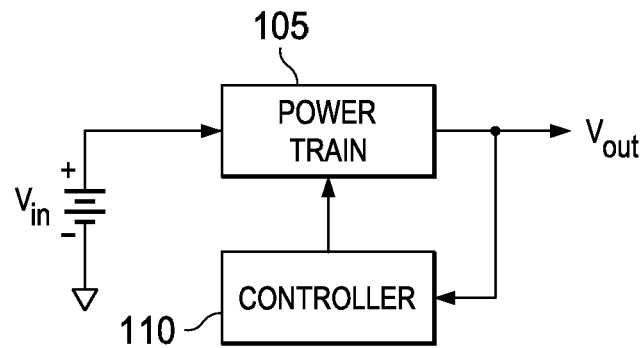
FIG. 1 illustrates a block diagram of a power converter controlled by a conventional controller.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power system including power converters with a controller and, more particularly, a controller for a power converter that regulates an output characteristic of the power converter at an output thereof that adaptively controls an internal operating characteristic of the power converter to increase power conversion efficiency in response to a parameter of the power converter measured after a manufacturing step and/or an environmental parameter of the power converter. The parameters mentioned above are typically measured after the power converter(s) are implemented and/or after a signal is received from an external source representing an environmental parameter or a signal indicating a system operational state or a change in a system operational state.

Regarding the environmental parameters, examples thereof include, without limitation, a signal indicating the existence of a paralleled power converter, the operational state of the paralleled power converter, that the powered system is operating from a backup power source, a request for a particular load voltage, an indication that a particular portion of the load has failed, or has been disabled, or is operating at a reduced power level. Further examples indicating a system operational state include, without limitation, a signal providing a performance state or a core state of a processor such as a P-state or C-state, indicating, for example, that the system is operating from emergency power or battery reserve, that redundant hardware such as a redundant power converter may have been disabled, that the system is not providing a critical function such as during an off-hours timeframe, that the system is sustaining substantial thermal margins allowing selected fans to be disabled and/or the fan speed to be substantially reduced, that the system is about to transition to a higher level of system performance, or that a requirement for a specified holdover time can be relaxed. An example of a signal indicating a change in a system operational state is a signal indicating that a load current will change from a first current level to a second current level at or around a particular time.

Additionally, the controller for a power converter according to the principles of the present invention can control, alter, relax, or differently constrain an internal operating characteristic (such as a gate drive voltage level, a switching frequency, an internal voltage or current, etc.) or an output characteristic (such as a regulated voltage setpoint of the power converter) to improve an efficiency thereof in response to signals from an external source representing an environmental parameter (such as the existence of a parallel-coupled power converter powering a common load) or in response to a signal indicating a system operational state. For example, the internal dc bus voltage of a power converter might be adaptively reduced to improve the power conversion efficiency of a front-end boost power converter, recognizing that such voltage reduction would directly affect the holdover capability of the power converter during periods of loss of ac input voltage (often referred to as line dropout), which might be a required internal operating characteristic. Holdover capability is generally inversely proportional to the load on the power converter and would depend on the presence and operational state of a paralleled power converter.

The data from an external source representing an environmental parameter can be employed by an adaptive controller, for example, to reduce the internal dc bus voltage to a particular level above a lower voltage limit dependent on the measured power converter load and the external data, and thereby improve operating efficiency in view of an internal characteristic or an output characteristic, but constrained by a signal from an external source. Examples of a response to a signal indicating a system operational state include, without limitation, selectively disabling paralleled synchronous rectifiers during a sustained light load operating condition, disabling a power factor correction function in a boost power converter and relying on a peak-charging mechanism to sustain an internal bus voltage, selectively disabling one or more phases of a multi-phase power converter such as a multi phase boost power factor correction ("PFC") power converter, or a multi phase implementation of a DC/DC power converter, disabling a redundant power converter when such redundancy is not required for system operation, and selectively disabling and/or reducing the speed of power converter fans that may not be needed from a system operational consideration.

Referring initially to FIG. 1, illustrated is a block diagram of a power converter controlled by a conventional controller. The power converter includes a power train 105 coupled to a source of electrical power (represented by a battery, but may be other sources of power, such as ac power) for providing an input voltage $V_{in}$ for the power converter. The power converter also includes a controller 110, and provides power to a system (not shown) such as a microprocessor coupled to an output thereof. The power train 105 may employ a buck topology as illustrated and described with respect to FIG. 2 below.

The power train 105 receives an input voltage $V_{in}$ at an input thereof and provides a regulated output characteristic (e.g., an output voltage $V_{out}$) to power a microprocessor or other load coupled to an output of the power converter. The controller 110 is typically coupled to a voltage reference representing a desired characteristic such as a desired system voltage from an internal or external source associated with the microprocessor, and to the output voltage $V_{out}$ of the power converter. In accordance with the aforementioned characteristics, the controller 110 provides a signal to control a duty cycle and a frequency of at least one power switch of the power train 105 to regulate the output voltage $V_{out}$ or another characteristic thereof. Thus, the controller 110 for the power train 105 of a power converter, particularly a switch-mode power converter, generally measures an internal operating characteristic or an output characteristic of the power converter and controls a duty cycle of a power switch therein in response to the measured characteristic to regulate the internal operating characteristic or the output characteristic thereof.

A driver (not shown) may be interposed between the controller 110 and the power train 105 to provide a drive signal(s) for the power switch(es) with sufficient amplitude and with waveform characteristics to efficiently enable or disable conductivity of the power switch(es). In accordance with the aforementioned characteristics, a drive signal is provided by a driver to control a duty cycle and a frequency of one or more power switches of the power converter, preferably to regulate the output voltage $V_{out}$ thereof. For a P-channel metal-oxide semiconductor power switch, a gate drive signal is typically driven negative (with respect to the source terminal) to turn on the power switch, and for an N-channel metal-oxide semiconductor power switch, a gate drive signal is typically driven positive (with respect to the source terminal) to turn on the power switch. A driver may employ techniques to provide sufficient signal delays to prevent shoot-through currents when controlling multiple power switches in a power converter.

Figure 2:
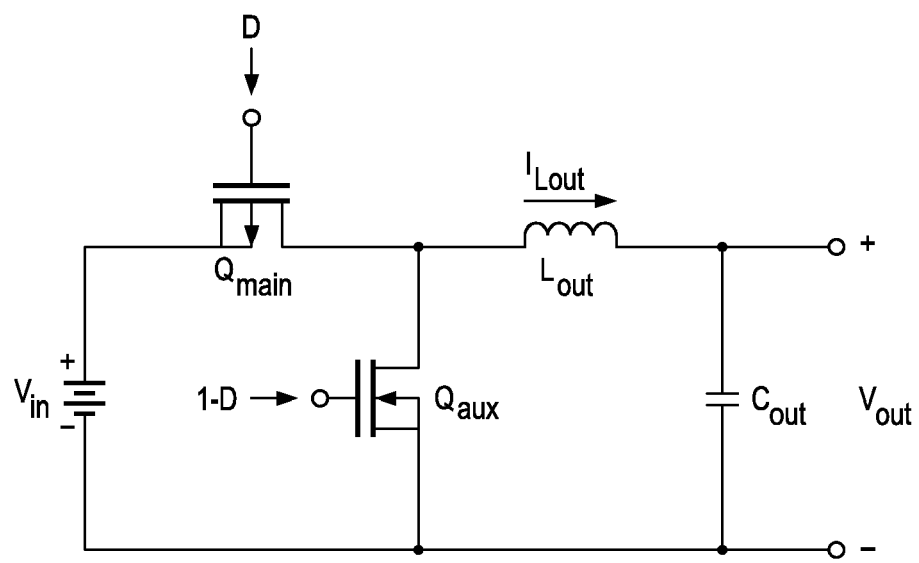
FIG. 2 illustrates a schematic diagram of an exemplary power train of a buck power converter.

Turning now to FIG. 2, illustrated is a schematic diagram of an exemplary power train of a buck power converter. The power train of the power converter receives an input voltage $V_{in}$ (e.g., an unregulated input voltage) from a source of electrical power (represented by a battery) at an input thereof and provides a regulated output voltage $V_{out}$ to power, for instance, a microprocessor at an output of the power converter. In keeping with the principles of a buck topology, the output voltage $V_{out}$ is generally less than the input voltage $V_{in}$ such that a switching operation of the power converter can regulate the output voltage $V_{out}$. A main power switch $Q_{main}$ is enabled to conduct by a gate drive signal D for a primary interval and couples the input voltage $V_{in}$ to an output filter inductor $L_{out}$. During the primary interval, an inductor current $I_{Lout}$ flowing through the output filter inductor $L_{out}$ increases as a current flows from the input to the output of the power train. An ac component of the inductor current $I_{Lout}$ is filtered by an output capacitor $C_{out}$.

During a complementary interval, the main power switch $Q_{main}$ is transitioned to a non-conducting state and an auxiliary power switch $Q_{aux}$ is enabled to conduct by a complementary gate drive signal 1-D. The auxiliary power switch $Q_{aux}$ provides a path to maintain a continuity of the inductor current $I_{Lout}$ flowing through the output filter inductor $L_{out}$. During the complementary interval 1-D, the inductor current $I_{Lout}$ through the output filter inductor $L_{out}$ decreases. In general, the duty cycle of the main and auxiliary power switches $Q_{main}$, $Q_{aux}$ may be adjusted to maintain a regulation of the output voltage $V_{out}$ of the power converter. Those skilled in the art understand that the conduction periods for the main and auxiliary power switches $Q_{main}$, $Q_{aux}$ may be separated by a small time interval to avoid cross conduction current therebetween and beneficially to reduce the switching losses associated with the power converter. Thus, the power train of a switch-mode power converter generally includes a plurality of power switches coupled to reactive circuit elements to provide the power conversion function therefore.

Figure 3:
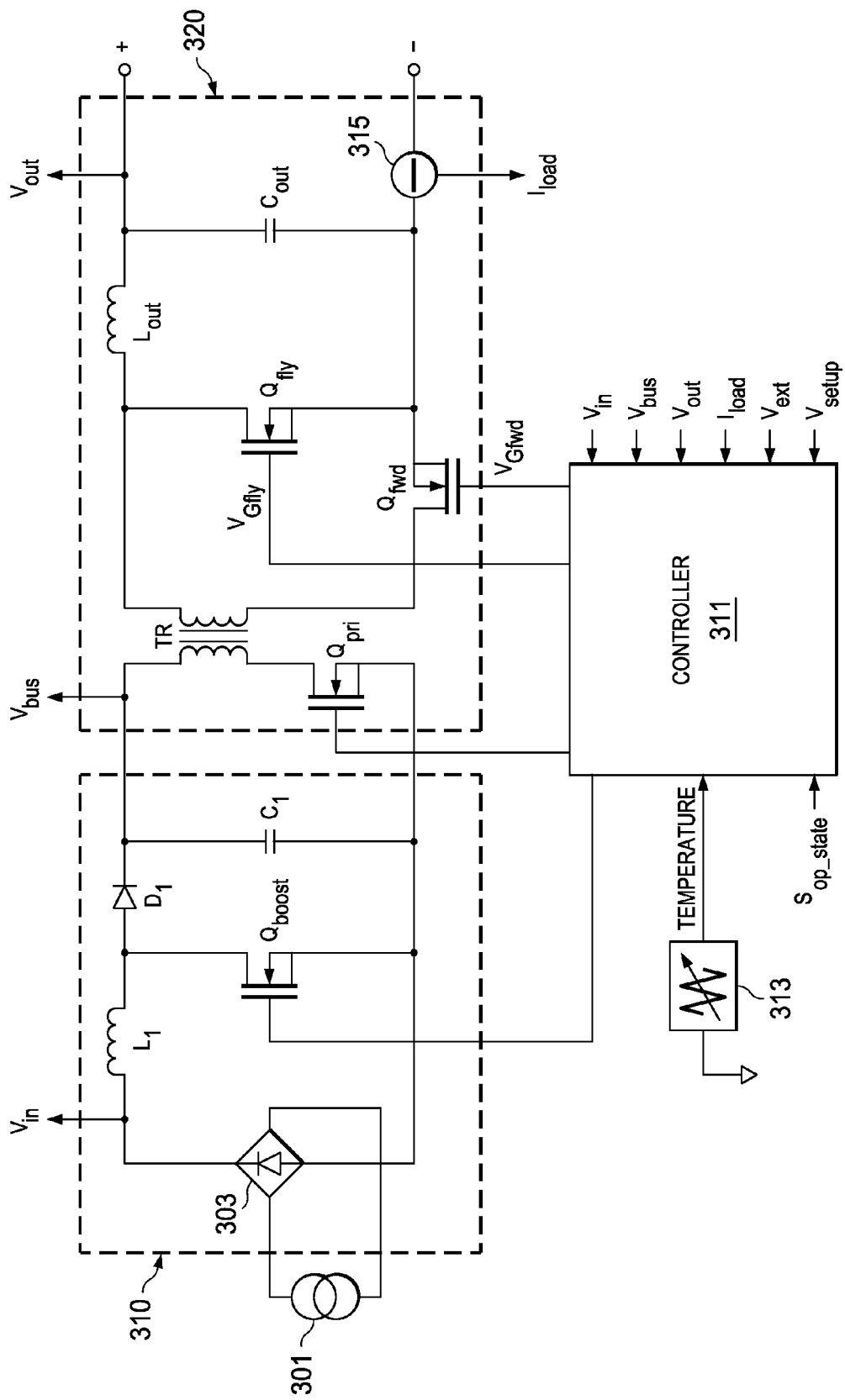
FIG. 3 illustrates a schematic diagram of an embodiment of a power converter including a controller constructed according to the principles of the present invention.

Turning now to FIG. 3, illustrated is a schematic diagram of an embodiment of a power converter including a controller 311 constructed according to the principles of the present invention. The power converter includes two exemplary power stages, namely, a first power stage 310 (e.g., a boost power stage possibly employed to perform power factor correction) and a second power stage (e.g., an isolating dc-to-dc power stage) 320. The input power source 301 to the first power stage 310 is an ac power source, which is coupled to a diode bridge rectifier 303. The first power stage 310, controlled by controller 311, produces an internal regulated bus voltage $V_{bus}$ across a capacitor $C_1$, which provides the input voltage to the second power stage 320. The first power stage 310 includes boost power switch $Q_{boost}$ and diode $D_1$, which alternately conduct to transfer charge from the input power source 301 through an inductor $L_1$ to the capacitor $C_1$. The controller 311 senses the rectified input voltage $V_{in}$ and the internal bus voltage $V_{bus}$ to control a duty cycle of the boost power switch $Q_{boost}$, to regulate the bus voltage $V_{bus}$ and to control the power factor of power drawn from the input power source 301.

The second power stage 320 includes isolation transformer TR and a power switch $Q_{pri}$ in series with the primary winding thereof. Synchronous rectifier switches $Q_{fwd}$, $Q_{fly}$ are power switches coupled in series across a secondary winding of the isolation transformer TR to rectify the voltage therefrom, which winding voltage is coupled to an output filter including an output inductor $L_{out}$ and an output capacitor $C_{out}$. The controller 311 provides control signals (e.g., gate control signals) $V_{Gfwd}$, $V_{Gfly}$ to control the synchronous rectifier switches $Q_{fwd}$, $Q_{fly}$, respectively. A brief time delay $\Delta T$ between conduction intervals of the synchronous rectifier switches $Q_{fwd}$, $Q_{fly}$ is provided by the controller 311 to prevent cross conduction therebetween. In a preferred embodiment, the controller 311 selects the time delay $\Delta T$ dependent on operating conditions of the power converter as described hereinbelow to provide improved power conversion efficiency.

Figure 4:
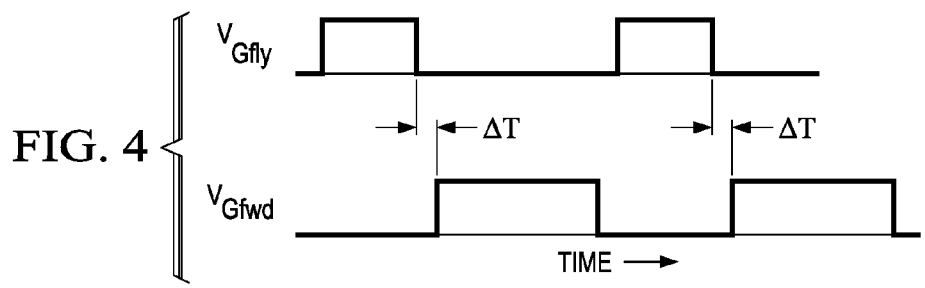
FIG. 4 illustrates exemplary waveform diagrams to control the conduction intervals of selected power switches of the power converter of FIG. 3 with an intervening delay therebetween.

Turning now to FIG. 4, illustrated are exemplary waveform diagrams to control the conduction intervals of selected power switches of the power converter of FIG. 3 with an intervening delay therebetween. More specifically, FIG. 4 illustrates an example of a time delay $\Delta T$ between the gate control signals $V_{Gfwd}$, $V_{Gfly}$ to control the conduction intervals of the synchronous rectifier switches $Q_{fwd}$, $Q_{fly}$, respectively.

Returning now to the description of the power converter of FIG. 3, the output filter attenuates ac components present across the secondary winding of transformer TR to provide a substantially constant dc output voltage $V_{out}$. The output voltage $V_{out}$, as well as the load current $I_{load}$ sensed by a sensor (e.g., a current sensing circuit element 315), is sensed by controller 311. Various circuit elements capable of sensing a load current, including a low resistance current-sensing resistor or a current-sensing transformer, are well known in the art and will not be described herein. Although the controller 311 is shown directly coupled to both sides of the isolation transformer TR, circuit elements to provide the necessary level of isolation for a controller 311 for a particular application are also well known in the art and will not be described herein. A thermistor (or other suitable thermal sensor) 313 provides a temperature measurement to the controller 311 at a selected point(s) in or about the power converter. Typical points for temperature sensing include a location adjacent to a power switch or to an isolation transformer, and may include the ambient temperature outside the power converter itself. Although one thermistor 313 is illustrated in FIG. 3, a plurality of thermistors may also be included within the scope of the invention to provide multiple temperature measurements to the controller 311. The detailed operation and characteristics of the first and second power stages 310, 320 are well known in the art, and will not be further described herein.

The controller 311 in the exemplary power converter illustrated in FIG. 3 senses and is responsive to the rectified input voltage $V_{in}$, the internal bus voltage $V_{bus}$, the power converter output voltage $V_{out}$, the load current $I_{load}$, as well as a signal "Temp" representing a temperature using the thermistor 313. In addition, the controller 311 senses and is responsive to an external signal $V_{ext}$ indicating an environmental parameter from an external source such as a server powered by the power converter, and to a setup signal $V_{setup}$ that may provide the result of a parameter measured in a test fixture after a manufacturing step to set or otherwise tailor parameters for the operation of the controller 311. In a preferred embodiment, the controller 311 includes digital processing capability at least comparable to that of a low-end microprocessor (or other digital implementations, such as a microcontroller, digital signal processor, a field-programmable gate array, or complex programmable logic device), and is operative to adaptively improve (e.g., optimize) the efficiency of the power converter from a variety of data and signal sources.

The controller 311 is configured to augment the operating efficiency of the power converter in response to a sensed or signaled internal operating characteristic and/or an output characteristic, a power converter parameter measured after a manufacturing step, and a signal from an external source representing an environmental parameter obtained from an external source such as a signal from a server being powered. Exemplary environmental parameters obtained from an external source, which reflect how the power converter is being used in an application, include a signal indicating parallel operation with a second power converter, an indication that a paralleled power converter has failed, an indication that the power converter is supporting a critical application requiring a modified trade-off between power conversion efficiency and reliability, and an indication that the system is operating from a back-up power source, and may signal, for example, a lower limit for a dc bus voltage, reflecting a modified need for power converter holdover to accommodate altered statistics for a transient power outage condition.

The controller 311 may also respond to a signal indicating a system operational state $S_{op\_state}$, which may be provided by a power system controller (such as power system controller described hereinbelow with reference to FIG. 11). The responses may include, without limitation, disabling a power factor correction function for the boost power switch $Q_{boost}$, disabling a drive signal for synchronous rectifier switches $Q_{fly}$, $Q_{fwd}$, operating at a lower switching frequency because the system can tolerate a higher ripple voltage in view of a present system operational state, or disabling a particular power converter because sufficient redundant or nonredundant operation can be sustained presently by the system. Further responses may include operating at a higher switching frequency, etc., because the system is about to enter a system state with a higher required level of system performance.

The controller 311 may include a multidimensional table or other functional representation of a value to control an internal operating characteristic or an output characteristic of the power converter. Multidimensional inputs to such a table or other functional representation include signals representing an internal operating characteristic, an output operating characteristic, a power converter parameter measured after a manufacturing stage, a parameter measured on a representative power converter unit, and/or a signal representing an environmental parameter or a system operational state. There are references utilizing lookup tables and other multidimensional functional representations directed to automotive engine map and lookup table systems such as U.S. Pat. No. 5,925,088, entitled "Air-fuel Ratio Detecting Device and Method," to Nasu, issued Jul. 20, 1999, U.S. Pat. No. 7,076,360, entitled "Auto-Ignition Timing Control and Calibration Method," to Ma, issued Jul. 11, 2006, and U.S. Pat. No. 6,539,299, entitled "Apparatus and Method for Calibrating an Engine Management System," to Chatfield, et al., issued Mar. 25, 2003, which are incorporated herein by reference.

Figure 5A:
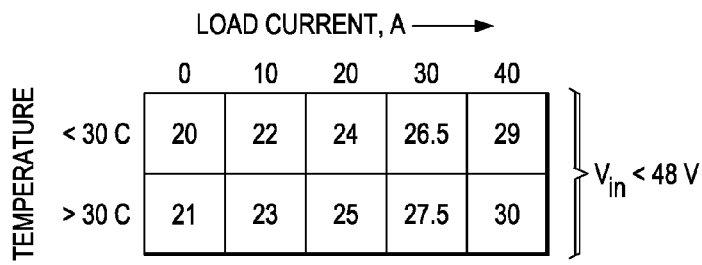
FIGS. 5A and 5B illustrate diagrams of exemplary multi-dimensional tables for the time delays for the control signals to control the conduction intervals of synchronous rectifier switches in accordance with a representative operating parameter of the power converter of FIG. 3.
Figure 5B:
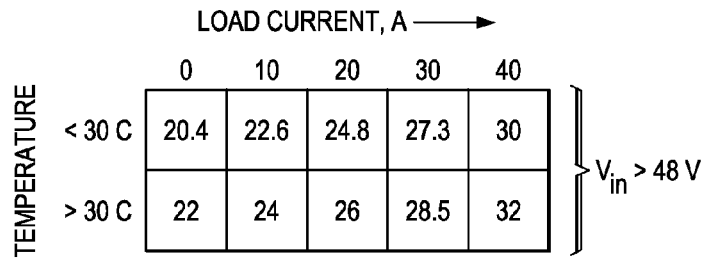

Turning now to FIGS. 5A and 5B, illustrated are diagrams of exemplary multidimensional tables for the time delays ΔT (in nanoseconds) for the gate control signals $V_{Gfwd}$, $V_{Gfly}$ to control the conduction intervals of the synchronous rectifier switches $Q_{fwd}$, $Q_{fly}$, respectively, in accordance with a representative operating parameter of the power converter of FIG. 3. More specifically, FIG. 5A demonstrates the time delay ΔT with the input voltage $V_{in}$ being below about 48 volts and FIG. 5B demonstrates the time delay ΔT with the input voltage $V_{in}$ being above about 48 volts. The tables, listing delay in nanoseconds between opening a first power switch and closing a second power switch (e.g., the synchronous rectifier switches $Q_{fwd}$, $Q_{fly}$) is accessed along a row with suitably quantized load current $I_{load}$, and along a column with suitably quantized temperature. The entries in the table are obtained by experimentally varying switch delay in a test set after manufacture of the power converter, and observing the effect of various delays on power conversion efficiency. The tables reflect a range of different values of input voltage $V_{in}$ measured for the particular power converter unit after a manufacturing stage. Of course, tables can be constructed with additional dimensions, accommodating additional parameters such as an output voltage $V_{out}$, and internal bus voltage $V_{bus}$, an input signal from an external source indicating an environmental parameter, etc., and finer levels of granularity. Various methods of interpolation between entries in the tables are well known in the art, and will not be described in the interest of brevity.

Such multidimensional tables can be used, for example, to control the switching frequency of a power converter. Switching frequency in the prior art is generally set as a design parameter, and is selected and fixed during a stage of design. The selected switching frequency is generally the result of a trade-off that considers, for example, the loss characteristics of the core material of the isolation transformer which depend on, without limitation, transformer core temperature, the primary-to-secondary turns ratio of the transformer, the expected thermal environment of the application, the heat transfer characteristics of the resulting power converter design, and the particular batch of core material from which the magnetic core thereof was formed. The resulting core loss for a particular power converter unit can also be substantially dependent on core characteristics such as a flux gap and core area of the particular core that was installed, all of which are substantially unknown before the power converter is manufactured.

In addition, the selected switching frequency is a result of consideration of other frequency dependent losses within the power converter. For example, gate drive losses are generally proportional to switching frequency and depend on the particular manufacturing run of power switches employed therein. Thus, altering the switching frequency for a particular application using a table constructed according to the principles of the present invention, considering manufacturing data, actual load current, and other measured or sensed variables can result in improved power conversion efficiency within a predetermined set of operating constraints that may be signaled from an external source. A test set can be readily constructed, as is well known in the art, to vary switching frequency and observe the effect on power conversion efficiency. Entries are then made in the table to represent preferable switching frequencies. Static efficiency optimization approaches of the prior art that use a predetermined curve or other fixed approach do not advantageously achieve the benefits of improved efficiency with greater flexibility to respond to additional data as described herein.

Figure 6:
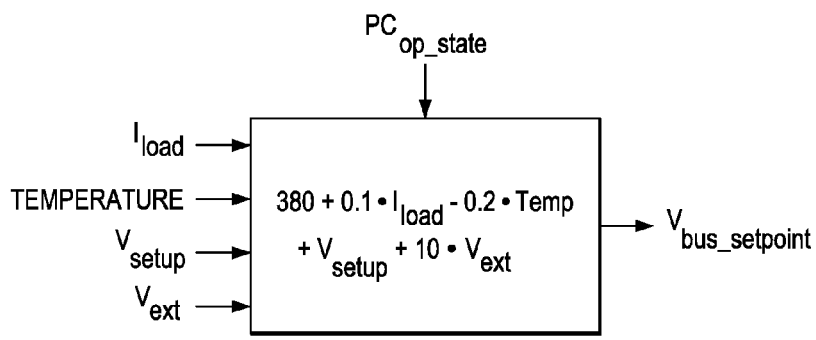
FIG. 6 illustrates an embodiment of a functional representation to improve power conversion efficiency constructed according to the principles of the present invention.

Turning now to FIG. 6, illustrated is an embodiment of a functional representation to improve power conversion efficiency constructed according to the principles of the present invention by determining a controllable parameter such as an internal bus voltage setpoint $V_{bus\_setpoint}$ of the power converter. An exemplary function is represented dependent on load current $I_{load}$, operating temperature, data acquired after a manufacturing step, and data from an external source. The exemplary functional dependence illustrated in FIG. 6 for the internal bus voltage setpoint $V_{bus\_setpoint}$ for an internal bus voltage is:

$$V_{bus\_setpoint}=380+0.1 \cdot I_{load}-0.2 \cdot \text{Temp}+V_{setup}+10 \cdot V_{ext},$$

where "$I_{load}$" represents a sensed power converter load current, "Temp" represents a sensed temperature using a thermistor or other temperature sensing element for a location in or about the power converter, "$V_{setup}$" represents a correction constant obtained from a test set after a manufacturing step, and "$V_{ext}$" represents a signal from an external source that might assume the values 0 and 1 to indicate the presence or absence of a paralleled power converter (see, e.g., FIG. 3 and the related description therefor). A constant "380" is a nominal number to describe the internal bus voltage setpoint $V_{bus\_setpoint}$. Other functional relationships including combinations of curve fits or other algorithmic relationships can be used within the broad scope of the present invention to meet the needs of a particular application. The controller 311 illustrated in FIG. 3 may use the internal bus voltage setpoint $V_{bus\_setpoint}$ as a reference voltage to control the internal bus voltage $V_{bus}$ illustrated and described with reference to FIG. 3.

Figure 11:
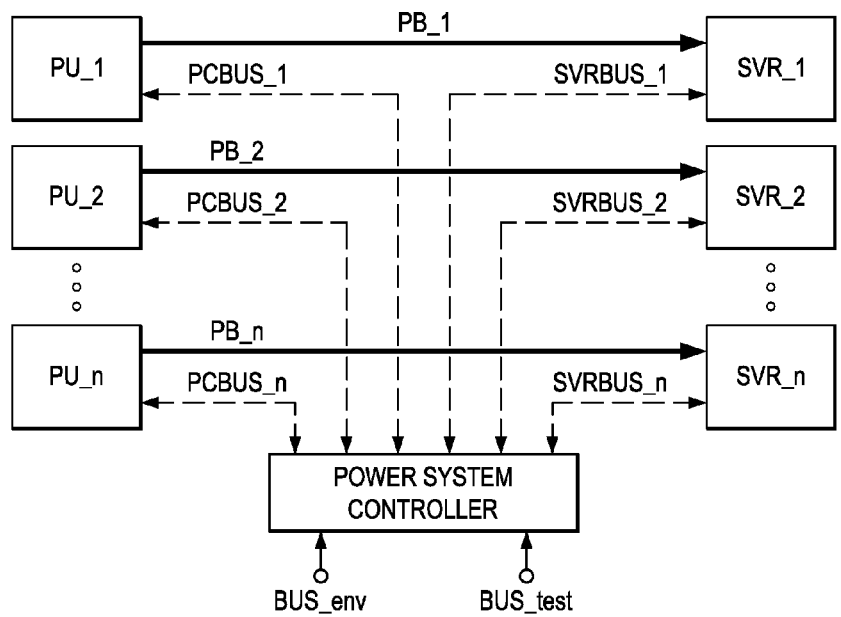
FIG. 11 illustrates a block diagram of an embodiment of a power system coupled to loads and including power converters controlled by a power system controller constructed according to the principles of the present invention.

The functional representation for the internal bus voltage setpoint $V_{bus\_setpoint}$ to improve power conversion efficiency illustrated in FIG. 6 may be further enhanced by a power converter operational state $PC_{op\_state}$ based on a command from a power system controller (see FIG. 11 and the related description). An alternative functional representation for the internal bus voltage setpoint $V_{bus\_setpoint}$ may be used depending on the value of the power converter operational state $PC_{op\_state}$ indicating, for example, a command to reduce holdover time. An alternative functional representation may also be used for the internal bus voltage setpoint $V_{bus\_setpoint}$ if a power system employing the power converter anticipates a changing system operational state.

The use of tables, functional relationships, and curve fits to control an operating parameter for a controller of a power converter, constructed according to the principles of the present invention, can advantageously use the extensive data ordinarily acquired by test fixtures at various stages of the manufacturing process. The test fixtures are generally configured to sweep a broad range of operating conditions from a particular power converter unit, or from a representative power converter unit, or from power converter units produced during a run of representative power converter units, and can even operate the power converter unit over a range of temperatures and for an extended period of time (e.g., during "burn in"). A test fixture can be arranged to operate a power converter over a range of trial values for a controllable parameter and to select a value that provides a preferable operating efficiency for the particular power converter under test. Thus, the efficiency program for a particular power converter can be tailored to represent the particular characteristics of the individual components from which the power converter unit is built. In a preferred arrangement, the test fixture is programmed to automatically search for the best value for the controllable parameter.

It is recognized that the timescale for the response of a controller to different internal and external stimuli can preferably be different. For example, the voltage level of an internal bus, which generally depends on charging and discharging a capacitor, might be practically changed over a period of hundreds of milliseconds, or even seconds, whereas the switching frequency of a power conversion stage or the timing delay between power switch conduction intervals can be readily changed on a much faster time scale, ultimately on a cycle-by-cycle basis. It may even be inappropriate to substantially change operating parameters such as an internal bus voltage level over intervals of time shorter than several seconds. Some internal operating characteristics or parameters would inherently change or would be inherently varied over a relatively long period, such as the input current of an ac front end, compared to other time scales within a power converter, and require a period of time to sense or alter an average or peak value. The internal parameters may be monitored over a longer time interval before the controller responds to a change in an internal operating characteristic or an output characteristic to augment power conversion efficiency.

Thus, for example, a controller may control an internal operating characteristic of a power converter in a step-by-step manner during an efficiency enhancement (e.g., optimization) process on a time scale substantially different from a time scale for controlling the duty cycle of the power converter. A parameter can be controlled on a slow timescale by using a digital representation of a low pass filter to retard changes in a parameter. An exemplary equation representing a low pass filter implemented over discrete time steps is:

$$V_{bus,n} = (1-\tau) \cdot V_{bus,n-1} + \tau \cdot V_{bus,desired}$$

where "$V_{bus,n}$" represents a filtered bus reference voltage at time step "n" to control an internal bus voltage on a slow time scale, "$\tau$" represents a parameter that sets the time scale for the filtering process, "$V_{bus,n-1}$" represents the filtered bus reference voltage at the previous time step "n-1," and "$V_{bus,desired}$" represents a desired, optimized bus voltage produced by a functional relationship or a table as described hereinabove.

In a related embodiment, a controller for a power converter may enhance (e.g., optimize) the operating efficiency (or other desirable parameter) of the power converter in response to a sensed or signaled internal operating characteristic and/or an output characteristic, using parameters measured on a representative power converter. For example, a multidimensional table or other functional representation of a value to control an internal operating characteristic or an output characteristic of the power converter could be derived from testing one or more representative power converters, as opposed to testing the actual power converter to be controlled. Multidimensional inputs to such a table or other functional representation may include, without limitation, signals representing an internal operating characteristic, an output operating characteristic, a power converter parameter measured during a test or characterization phase, and/or a signal representing an environmental parameter.

During a typical power converter product development process, a product design may proceed through several stages, for example, prototyping, pilot (or small volume) production, characterization and/or qualification testing, safety agency and electromagnetic interference ("EMI") compliance testing, highly accelerated life testing, highly accelerated stress screening, and final release to production. During the characterization and/or qualification testing phase, one or more representative power supplies may be subjected to extensive testing to ensure compliance with the end specification. This testing may be automated by one or more racks of automated test equipment, enabling possibly many thousands of individual tests to be performed.

During an exemplary characterization testing stage, a representative power converter may be extensively tested over a wide variety of operating conditions. The characterization test may measure and collect thousands, or tens of thousands, of individual data points. These data may then be compiled into one or more multidimensional tables or other functional representation(s) and used by the control circuit to adjust an internal operating characteristic or an output characteristic of the power converter in order to operate the power converter at or near an optimal efficiency for a given set of conditions, while still enabling the power converter to meet its required specification. The characterization testing may also be repeated after a new manufacturing run to characterize the currently manufactured product.

Figure 7:
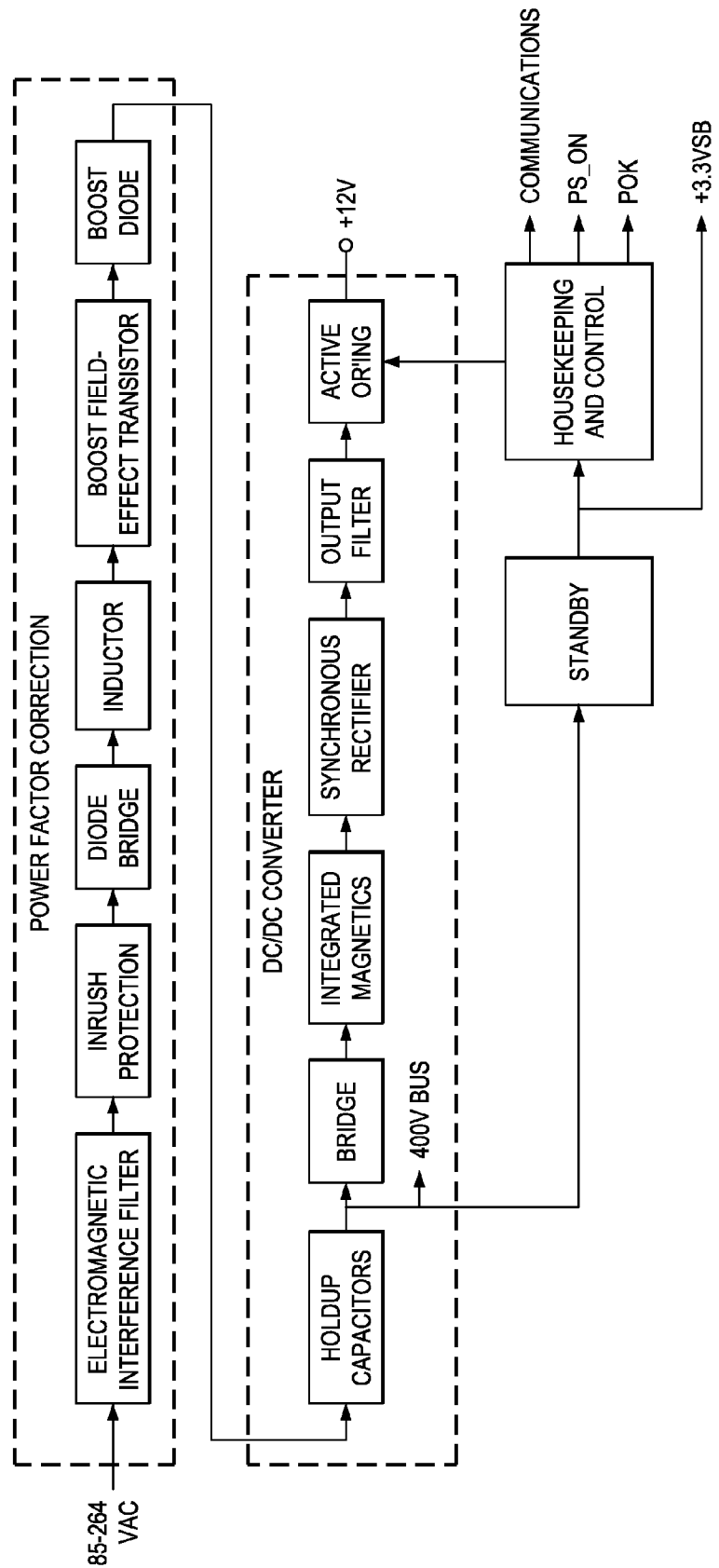
FIG. 7 illustrates a block diagram of an embodiment of a power converter constructed according to the principles of the present invention.

Turning now to FIG. 7, illustrated is a block diagram of an embodiment of a power converter constructed according to the principles of the present invention. In the exemplary embodiment illustrated in FIG. 7, a block diagram of an ac input, power factor correction, and dc output power converter is depicted. The power converter operates from a power source providing 85 to 264 V ac input, and provides outputs of +12V and 3.3 VSB (a standby voltage). The power converter also provides output signals PS_ON and POK indicating, respectively, that the power converter is turned on and power is "OK," as well as other "communications" signals typically provided between a power converter and a host system. It is readily understood by those skilled in the art that there are many ways to design an ac-to-dc power converter, and correspondingly there are many possible block diagrams that could suitably depict an exemplary power converter. It is also understood that the spirit and scope of the present invention is not limited to ac-to-dc power converters, but may encompass any type of power converter, including ac and/or dc input, as well as ac and/or dc output. Multiple input and/or multiple output power converters are also within the spirit and scope of the present invention.

FIG. 7 illustrates many of the constituent blocks of a power converter that may be controlled, as well as many of the internal nodes that may be measured and/or controlled, to improve operating efficiency. For example, a switching frequency of the boost field-effect transistors ("FETs"), and/or the bridge, may be adjusted based on operating conditions and/or on a system operational state to improve efficiency. Additionally, the voltage on the 400V bus may be adjusted, or the timing between bridge switches and a synchronous rectifier device ("sync rect") may be adjusted.

Figure 8:
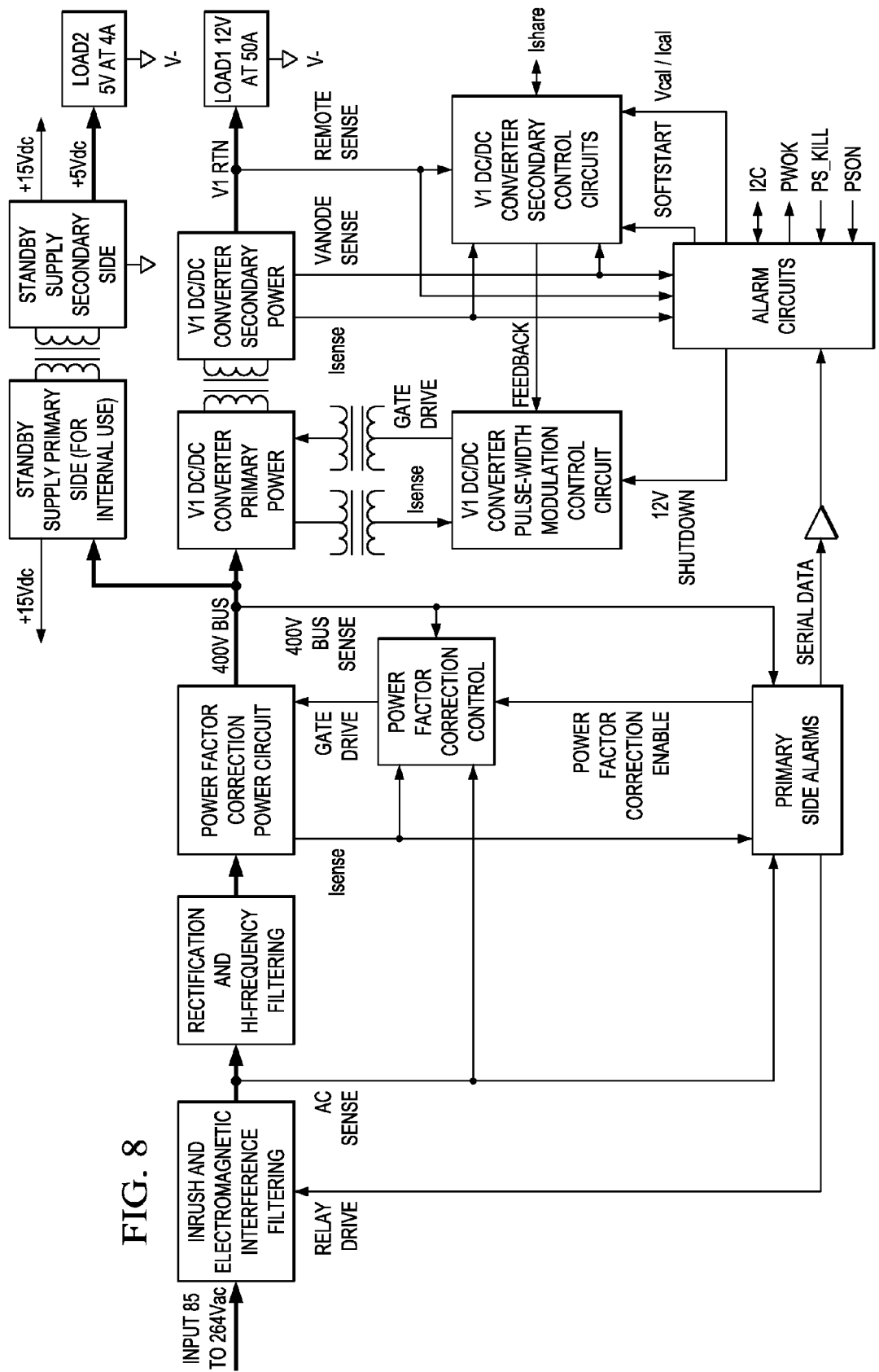
FIG. 8 illustrates a block diagram of an embodiment of a power converter constructed according to the principles of the present invention.

Turning now to FIG. 8, illustrated is a block diagram of an embodiment of a power converter (e.g., an ac-to-dc power converter) constructed according to the principles of the present invention and demonstrating in more detail possible control and alarm circuit connections. These control and alarm circuits may be realized using dedicated firmware-driven microcontrollers, digital control integrated circuits, application specific integrated circuits, field-programmable gate arrays, or any suitable electronic circuitry. The power factor correction ("PFC") control and primary alarm blocks (part of the primary control) of FIG. 8 illustrate some of the many internal nodes and circuits that may be measured and controlled. For example, the primary controller may monitor the input line voltage, frequency, and current, etc. It may also monitor the PFC output bus voltage (shown here as the 400V bus, although the bus voltage may be controlled to other voltage levels). The primary controller may control the PFC boost power switches using a variety of control techniques, including fixed and variable frequency, continuous current mode, discontinuous current mode, or critically continuous inductor current, to name but a few. The power converter could also employ additional components to achieve, for example, soft switching, with the controller capable of measuring and/or altering operating parameters affecting these additional components. The primary controller may also be capable of communicating with a secondary controller, and this communication may be bidirectional.

The secondary controller, including the pulse-width modulation ("PWM") control and alarm circuits, may monitor and control the parameters shown in FIG. 8, as well as others not shown. The secondary control can thus be used to control, among other things, switching frequency, operating mode, output voltage, timing relationships, etc. The secondary control may advantageously also enable or disable the operation of individual power switches (or banks of power switches) to improve power conversion efficiency. The illustrated embodiment of FIG. 8 also shows a means of communication allowing the power converter to communicate with a wide variety of devices including, but not limited to, a host processor, one or more pieces of automated test equipment, or another power converter. The communication protocol in the illustrated embodiment is a wired I²C bus, but could be realized with any suitable communication means or protocol, including wired and wireless, optical, radio frequency, etc. Additionally, the communications means need not be restricted to the secondary side, but may be located on the primary side, or may be on both primary and secondary sides.

Turning now to FIGS. 9A thru 9F, illustrated are examples of how power converter efficiency can vary as a function of operating conditions and operating environment in accordance with the principles of the present invention. The curves in FIGS. 9A thru 9F are merely illustrative of a few of the parameters or environmental conditions affecting power conversion efficiency, and are by no means meant to be exhaustive. In addition, the curve shapes and variations illustrated in FIGS. 9A thru 9F are meant for illustrative purposes only. The efficiency of different power converter designs may vary in a manner different from the exemplary curves.

Figure 9A:
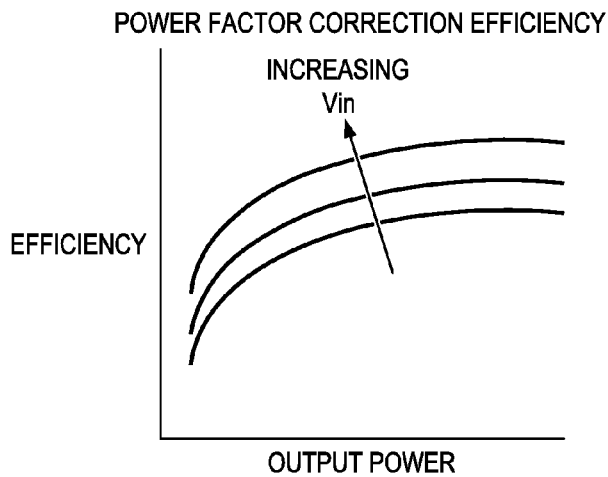
FIGS. 9A to 9F illustrate the dependence of power converter efficiency on various operating parameters and the operating environment in accordance with the principles of the present invention.
Figure 9B:
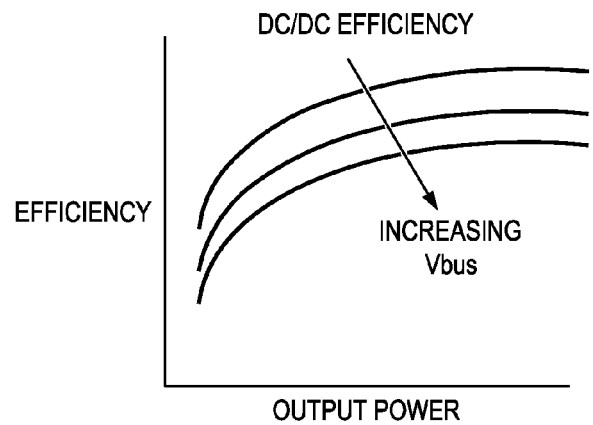
Figure 9C:
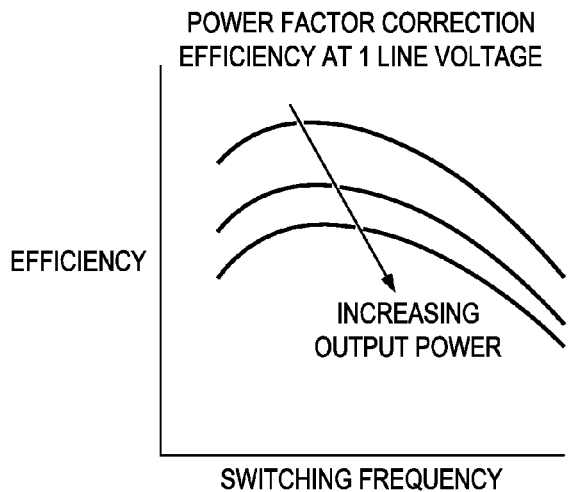
Figure 9D:
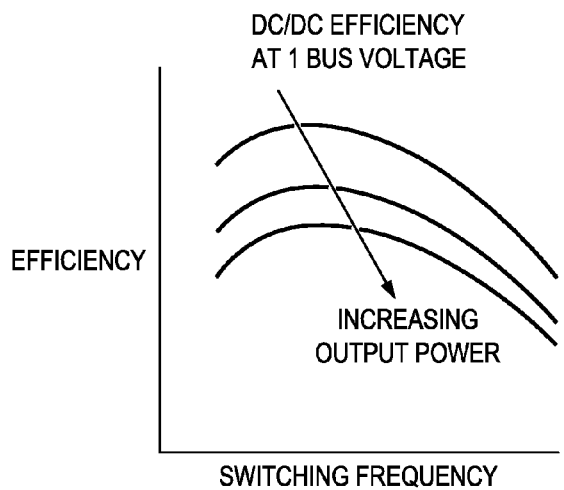
Figure 9E:
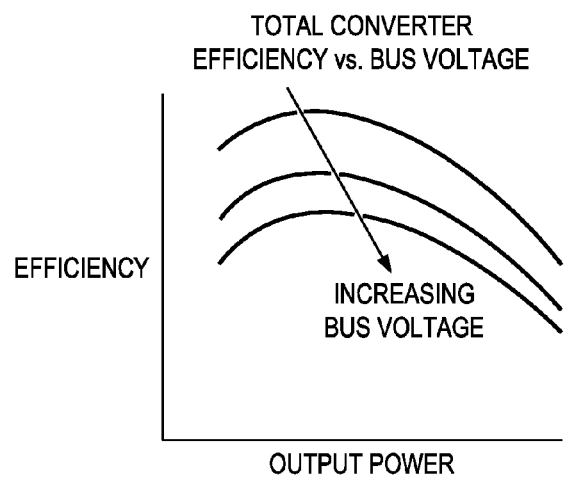

In FIG. 9A, the efficiency of the PFC section is illustrated as a function of both output power and input line voltage. In FIGS. 9A thru 9F, the arrows point in the direction of an increasing parameter. In FIG. 9B, the efficiency of the dc-to-dc section is illustrated as a function of both output power and bus voltage. In FIG. 9C, the efficiency of the PFC section is illustrated as a function of both output power and switching frequency at a single line voltage. A family of such curves could be generated at different ac line voltages. In FIG. 9D, the efficiency of the dc-to-dc section is illustrated as a function of both output power and switching frequency at a single bus voltage. A family of such curves could be generated at different dc bus voltages. In FIG. 9E, the efficiency of the power converter (PFC plus dc-to-dc sections) is illustrated as a function of both output power and bus voltage at a single line voltage. A family of such curves could be generated at different ac line voltages. Lastly, in FIG. 9F, the efficiency of the power converter (PFC plus dc-to-dc sections) is illustrated as a function of both output power and the timing delay between the bridge and synchronous rectifier switches, at a single line voltage. A family of such curves could be generated at different ac line voltages. Clearly, many other relationships could be measured for their effect on power converter efficiency including, but not limited to, temperature (internal and/or external), altitude, fan speed, number of power switching devices enabled, etc.

The number of different relationships that could be measured and data points collected is limited only by the ingenuity of the test engineer, time, and data memory resources. Over many such projects, an engineer may learn that certain relationship data has more of an impact on efficiency than others, and may learn how to intelligently limit the number of tests performed and data points collected to only those relationships having the greatest affect on efficiency.

Once the data is collected on one or more representative power converter units, multidimensional data table(s) or other functional representation(s) may be stored into the internal control memory of the power converter for use during operation. This stored data could comprise, for example, a look-up table, an algorithm, or any other suitable method of converting test data into an actionable control parameter. For example, assume an exemplary power converter constructed according to the principles of the present invention was operating in a server, perhaps in a data center. The exemplary power converter may sense one or more environmental and operating conditions including a system operational state. The power converter may determine that it is operating at 20% load, at 120V ac input at 59.9 Hz, with an inlet ambient temperature of 35° C. (other parameters could also be measured), and that the power system is operating at full operational performance. The primary and/or secondary controller(s) may then access a stored look-up table that specifies, for example, the proper switching frequency, bus voltage operating conditions, the number of interleaved phases to enable, and switch timing relationships in order to improve or optimize efficiency. The controllers may be programmed to wait for a predetermined amount of time at a given operating condition before making any adjustment. This type of delay could allow the power converter to avoid making an unnecessarily large number of adjustments.

It may be advantageous to limit the range of possible adjustments to only those values that allow the power converter to remain within specified operating requirements during any operating condition specified in a requirements document. It may also be advantageous to limit the range of possible adjustments to only those values that ensure that the components of the power converter do not exceed maximum stress levels, thereby improving reliability and reducing component or power converter failures. For example, a requirements document for a power converter may specify operation under a number of transient conditions, such as output load transients, input transients, brown-out conditions, line dropout conditions, temperature transients, etc.

Figure 10:
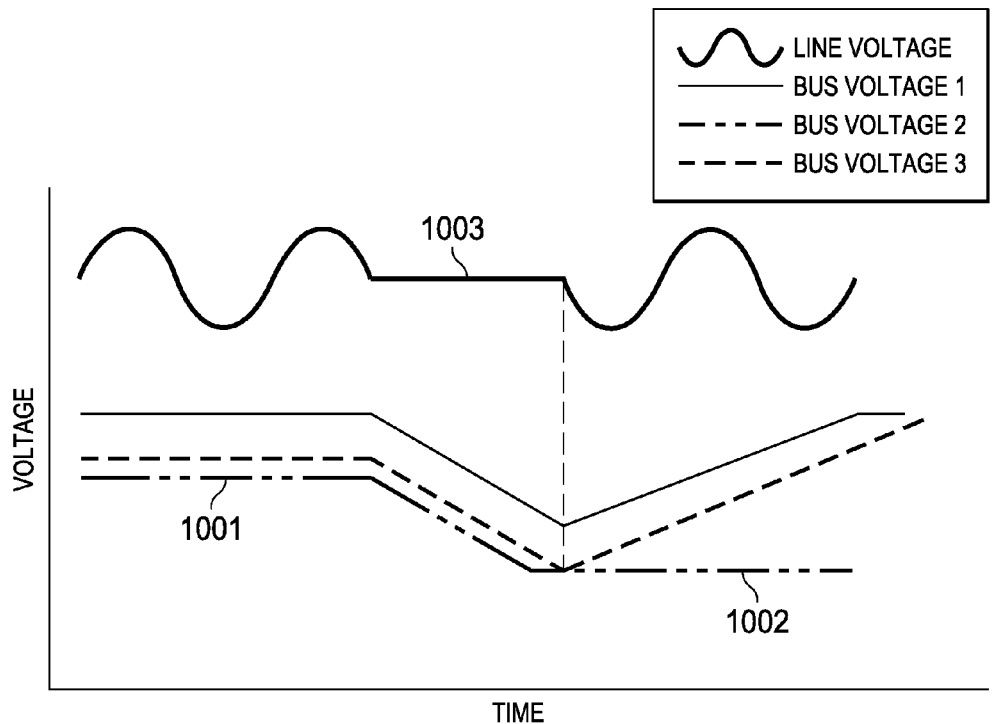
FIG. 10 illustrates an ac input voltage waveform including an exemplary input line voltage dropout transient, showing time histories of possible internal bus voltages in accordance with the principles of the present invention.

Turning now to FIG. 10, illustrated is an ac input voltage waveform including an exemplary input line voltage dropout transient, showing time histories of possible internal bus voltages in accordance with the principles of the present invention. The FIGURE shows time histories of possible internal bus voltages, and an ac input voltage waveform with a dropout period 1003 during which no ac input voltage is present. Illustrated for the internal bus voltages is a portion in which the slope 1001 of the internal bus voltage is load dependent. Also illustrated in the FIGURE is a bus undervoltage limit 1002. Power converters are often required to continue to provide output power for a period of time with the ac input voltage at or near zero. This time is typically referred to as the holdup time. When the input line voltage drops out, the dc-to-dc power converter section (see, e.g., FIG. 3) will continue to operate, pulling energy from the holdup capacitors, thereby reducing the voltage on the bus (designated $V_{bus}$ in FIG. 3). The bus voltage will continue to fall until the line voltage is restored. Note that the slope of the bus voltage will be steeper at a higher output load current. If the bus voltage is allowed to reduce below an under voltage limit, the dc-to-dc power converter will not be able to support the load and maintain regulation, thereby resulting in an out-of-specification condition (e.g., for a particular system operational state). If the exemplary power converter of FIG. 10 is operating at bus voltage "1," the power converter can operate within specification, but may be operating at a lower efficiency than desired. If, however, the power converter adjusted its bus voltage to bus voltage "2" in an effort to improve efficiency, the bus voltage will dip below the undervoltage limit before the end of the drop-out period.

A power converter constructed according to the principles of the present invention may sense a variety of input/output operating parameters, and could thus calculate, for example, the minimum (or a safe) bus voltage that could both improve efficiency and ensure that the power converter can maintain the proper holdup time through a line dropout event. This is illustrated by bus voltage "3" in FIG. 10. For a given output load condition, adjusting the bus voltage to bus voltage "3" both improves efficiency and ensures compliance with the specification. Thus, the exemplary power converter is capable of using a multidimensional data table(s) or other functional representation(s), in conjunction with sensed operating parameters, to determine an operating point with improved efficiency that also allows the power converter to maintain compliance with a specification.

There are many examples where adjustments to improve efficiency while maintaining compliance with a specification will require a power converter to make intelligent adjustments, possibly combining data stored in a multidimensional data table(s) or other functional representation(s) with sensed operating parameters in the adjustment computation. One such example concerns switching frequency adjustments. It may be advantageous to reduce a switching frequency under, for example, lighter output load conditions. However, if the load were to suddenly increase, the power converter controller must ensure that the magnetic components will not be detrimentally affected (by possibly saturating) at the combination of a higher load condition and a lower frequency operating condition, prior to the controller adjusting the switching frequency to a level more appropriate with the new load condition. Thus, a power system controller may consider a system operational state when altering a power converter switching frequency.

Figure 9F:
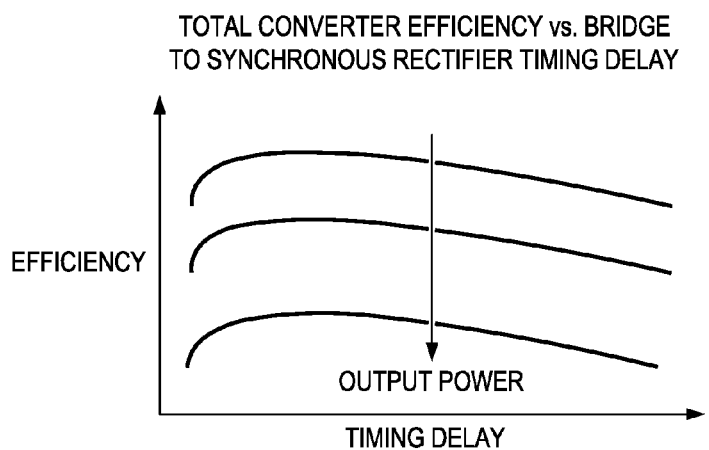

Another example can be found in switch timing adjustments, illustrated in FIG. 9F. The improved switch timing is often dependent on input or output current levels. For example, switch timing to improve efficiency at a lighter load may result in cross conduction at heavier loads (or vice versa), thereby causing a detrimental operation and possible failure of the power converter.

Turning now to FIG. 11, illustrated is a block diagram of an embodiment of a power system coupled to loads and including power converters controlled by a power system controller constructed according to the principles of the present invention. The loads are represented by a plurality of servers (designated "SVR_1 . . . SVR_n" and also referred to as "SVR") powered by respective power converters (designated "PU_1 . . . PU_n" and also referred to as "PU") over respective power buses (designated "PB_1 . . . PB_n" and also referred to as "PB"). Each server SVR may be individually coupled to a respective power converter PU for its power source as illustrated herein, or may be coupled to more than one power converter PU and powered in a redundant manner to form multiple redundant power converters PU. The power system controller (designated "PSC") may also be powered by one of the illustrated power converters PU, or by another power converter not shown.

The power converters PU are coupled to the power system controller PSC over respective power converter communication buses (designated "PCBUS_1 . . . PCBUS_n" and also referred to as "PCBUS") that conduct signals therebetween to communicate requests for a power converter operational state $PC_{op\_state}$ from the power system controller PSC to a power converter PU. The power system controller PSC may also be coupled over a bus (designated "BUS_env") to a circuit element (not shown) signaling an environmental parameter such as a component temperature. In addition, the power system controller PSC may be coupled over a bus (designated "BUS_test") to a signal source such as a manufacturing test set that provides a power converter parameter measured after a manufacturing step. The power system controller PSC receives signals representing a power converter status $PC_{status}$ from the power converters PU over the respective power converter communication buses PCBUS and transmits commands thereover for the power converter operational states $PC_{op\_state}$ to the power converters PU. The commands for the power converter PU to enter the power converter operational states $PC_{op\_state}$ can be used to enhance (e.g., optimize) an operational efficiency or reliability of the power converter PU and at a power system level.

An exemplary set of power converter operational states $PC_{op\_state}$ and an associated description thereof is illustrated in TABLE I below. A power converter operational state $PC_{op\_state}$ introduces an opportunity, which may be based on a signal received from a server SVR, to control an internal operating characteristic of a power converter PU, such as an internal bus voltage, a switching frequency, or a disabling of a power conversion operation such as active power factor correction. The power converter operational states $PC_{op\_state}$ indicate an operational condition beyond controlling an external characteristic such as an output voltage set point controlled by a VID signal. An example of a response to a signal indicating a power converter operational state $PC_{op\_state}$ from the power system controller PSC includes disabling one of a plurality of redundant power converters PU during a low power condition, such as during a reduced software load sensed at a power system level, with or without changing an output characteristic such as an output voltage of the remaining power converters PU. A power converter operational state $PC_{op\_state}$ may be determined from a signal from a server SVR indicating a processor core state, a software load on the power system, or a level of power system criticality.

are serial data buses such as $I^2C$ buses (or any other suitable communication protocol). In an alternative embodiment, parallel buses can be used.

As mentioned above, the power system controller PSC receives signals representing a power converter status $PC_{status}$ from the power converters PU over a respective power converter communication bus PCBUS. An exemplary set of power converter statuses $PC_{status}$ is shown below in TABLE II with an associated description thereof. For example, a power converter status flag setting of "1" may indicate an overheated condition for a power converter component, or a high level of ripple voltage on an internal circuit node, either event representing an out-of-specification or unanticipated operating condition for the power converter PU. A power converter status flag setting of "3" may indicate a load failure, wherein a load (e.g., server SVR) component draws a current beyond a rated value. The power system controller PSC may signal, as a consequence thereof, the need to replace a power converter

TABLE I

| $PC_{op\_state}$ | Power Converter Operational State | Power Converter Operational State Description |
|---|---|---|
| 0 | Fully Operational | All power converter components operational at full performance level |
| 1 | Reduced load | Reduced internal bus voltage (thereby reducing holdover time) |
| 2 | Light load | Elements of $PC_{op\-state1}$ plus active power factor correction control off, at least one synchronous rectifier switch disabled, and/or an interleaved phase disabled |
| 3 | Very Light Load | Elements of $PC_{op\-state2}$ plus reduced switching frequency |
| 4 | Reduced Redundancy | Elements of $PC_{op\-state3}$ plus temporarily disabling a power converter in a redundant set, but power converter remaining in a standby condition |
| 5 | Idle | Power converter fully disabled |

Each power converter PU responds to a command for a power converter operational state $PC_{op\_state}$ by enhancing (e.g., optimizing) its operating efficiency under the requested power converter operational state $PC_{op\_state}$. The power system controller PSC may command different power converter operational states $PC_{op\_state}$ to different power converters PU in the power system. Thus, one power converter PU may be disabled, while the other power converters PU continue to operate under a light system load, preferably with a consideration of measured operating efficiencies of the particular power converters PU installed. In such manner, a higher operating efficiency can be achieved on a system-level basis than can be achieved in an environment without such system-level communication. Alternatively, the power system controller PCS may sequentially operate different power converters PU at different times to reduce the overall power system failure rate by reducing the operating time of individual power converters PU.

The servers SVR communicate with the power system controller PSC over respective server communication buses (designated "SVRBUS_1 . . . SVRBUS_n" and also referred to as "SVRBUS") to communicate data to establish a system operational state with respect to the servers SVR. The data may include a processor P-state or C-state, a signal indicative of a level of system or power system functionality, and/or a signal anticipating a change in power system functionality. In a preferred embodiment, the various communication buses PU, temporarily operate a power converter PU at a lower level of performance, or indicate a generally lower level of power system reliability. The power system controller PSC may employ power converter status data to enhance (e.g., optimize) power system operating efficiency on a power system-level basis.

TABLE II

| $PC_{status}$ | Power Converter Status | Power Converter Status Description |
|---|---|---|
| 0 | Fully Operational | All power converter components operational at a full performance level |
| 1 | Failure Likely | Power converter operating with reduced operational capability |
| 2 | Failed | Power converter failed |
| 3 | Overloaded | Power converter unable to sustain an output voltage or current |

In FIG. 11, the power system controller PSC is illustrated as a block separate from the servers SVR. In an alternative embodiment, the power system controller PSC may be constructed as an element of one or more servers SVR, or as an element of one or more of the power converters PU.

Figure 12:
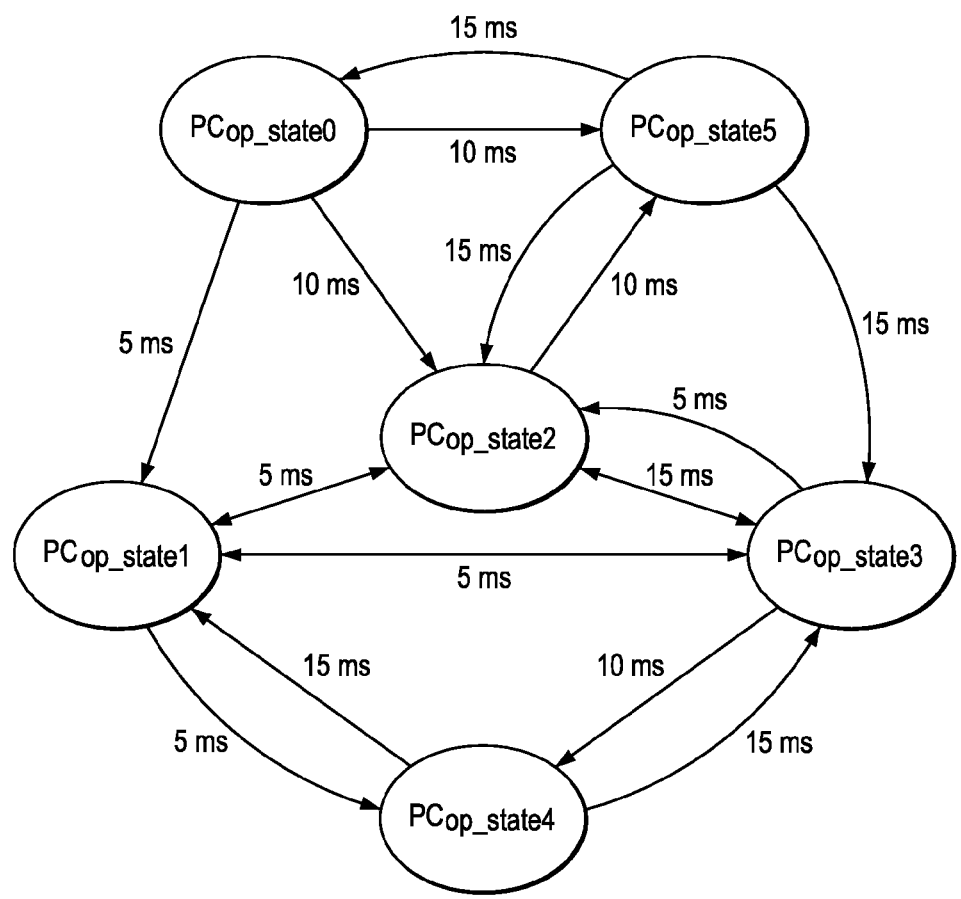
FIG. 12 illustrates a state transition diagram for a power converter constructed according to the principles of the present invention.

Turning now to FIG. 12, illustrated is a state transition diagram for a power converter constructed according to the principles of the present invention. The diagram illustrates power converter operational states $PC_{op\_state}$ based on commands from a power system controller and the allowable transition times therebetween. For example, the transition from the first power converter operational state $PC_{op\_state1}$ to the fourth power converter operational state $PC_{op\_state4}$ is 5 milliseconds ("ms") or less, wherein the reverse transition is 15 ms or less.

Transitions among the power converter operational states $PC_{op\_state}$ illustrated in FIG. 12 advantageously can be conditioned by the power system controller to control individual power converters to meet power system-level performance metrics. For example, a transition from the power converter operational state $PC_{op\_state0}$, a "fully operational" state, to the first power converter operational state $PC_{op\_state1}$, a "reduced load" state, may be performed in response to a system operational state requirement related to a processor core state signal indicating a transition of a processor core state from core state C0 to core state C1 or higher. The transitions may also be temporally conditioned. For example, persistent residence in the first power converter operational state $PC_{op\_state1}$ (e.g., for a time period greater than 0.5 seconds) may enable a transition to the fourth power converter operational state $PC_{op\_state4}$ ("reduced redundancy"). A transition to the fifth power converter operational state $PC_{op\_state5}$ ("idle") may be enabled upon receipt of a power converter status of two $PC_{status2}$ ("failed power converter") and receipt of a system operational state such as a processor core state with a value greater than or equal to one. Logic enabling particular state transitions in an embodiment of the present invention based on a power converter status $PC_{status}$ and on a system operational state can be readily constructed for a particular application.

Thus, a controller for a power converter advantageously providing improved power conversion efficiency and improved power system reliability has been introduced. A load is configured to provide a signal representing a system operational state to a power system controller coupled thereto. The power system controller in turn provides a command to the power converter to transition to or enter into a power converter operational state in accordance with the system operational state and a power converter status. The power system controller, therefore, induces the power converter to enter a power converter operational state. The power converter includes a controller and a power switch configured to conduct for a duty cycle and to provide a regulated output characteristic at an output thereof. The power converter controller is configured to provide a signal to control the duty cycle of the power switch as a function of the output characteristic. The controller thereby regulates an internal operating characteristic of the power converter to improve an operating efficiency of the power converter depending on a value of a system operational state. Thus, by communicating operational data among the power converters of the power system in accordance with a power system controller, the operational efficiency of the power system and its reliability can be enhanced (e.g., optimized) at a level beyond that which can be achieved with more limited powering arrangements.

Those skilled in the art should understand that the previously described embodiments of a controller for a power converter and related methods are submitted for illustrative purposes only. Those skilled in the art understand further that various changes, substitutions, and alterations can be made to the controller without departing from the spirit and scope of the invention in its broadest form. In addition, other embodiments capable of providing the advantages as described hereinabove are well within the broad scope of the present invention. While the controller and method have been described as providing advantages in the environment of a power converter, other applications therefor such as a controller for a motor or other electromechanical device are well within the broad scope of the present invention.

For a better understanding of power electronics, see "Principles of Power Electronics," by J. G. Kassakian, M. F. Schlecht and G. C. Verghese, Addison-Wesley (1991). For a better understanding of semiconductor devices and processes, see "Fundamentals of III-V Devices," by William Liu, John Wiley and Sons, (1999). For a better understanding of gallium arsenide processing, see "Modern GaAs Processing Methods," by Ralph Williams, Artech House, Second Ed. (1990). The aforementioned references are incorporated herein by reference.

Also, although the present invention and its advantages have been described in detail, it should be understood that various changes, substitutions and alterations can be made herein without departing from the spirit and scope of the invention as defined by the appended claims. For example, many of the controllers discussed hereinabove can be implemented in different methodologies and replaced by other processes, or a combination thereof, to form the devices providing improved efficiency for a power converter as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter coupled to a power system controller configured to receive a signal indicating a system operational state of a load coupled thereto, comprising:
   a power switch configured to conduct for a duty cycle to provide a regulated output characteristic at an output thereof; and
   a controller configured to receive a command from said power system controller to enter a power converter operational state as a function of said signal indicating said system operational state, said controller further configured to provide a signal to control said duty cycle of said power switch as a function of said output characteristic and in accordance with said command, thereby regulating an internal operating characteristic of said power converter to improve an operating efficiency thereof as a function of said system operational state.

2. The power converter as recited in claim 1 wherein said power converter is configured to enter said power converter operational state within a transition time from another power converter operational state.

3. The power converter as recited in claim 1 wherein said power system controller is configured to receive a signal indicating a power converter status of said power converter, said power converter operational state being a function of said power converter status.

4. The power converter as recited in claim 1 wherein said load includes a processor and said system operational state depends on one of a core state and a performance state of said processor.

5. The power converter as recited in claim 1 wherein said power converter operational state is selected from the group consisting of:
- a fully operational power converter,
- a reduced redundancy power converter, and
- an idle power converter.

6. A power system coupled to a load, comprising:
- a power system controller configured to receive a signal indicating a system operational state of said load and to select a power converter operational state as a function thereof; and
- a power converter, including:
  - a power switch configured to conduct for a duty cycle to provide a regulated output characteristic at an output thereof, and
  - a controller configured to receive a command from said power system controller to enter said power converter operational state and to provide a signal to control said duty cycle of said power switch as a function of said output characteristic and in accordance with said command, thereby regulating an internal operating characteristic of said power converter to improve an operating efficiency thereof as a function of said system operational state.

7. The power system as recited in claim 6 wherein said power system is coupled to another load and said power system controller is configured to receive another signal indicating another system operational state of said another load and to select another power converter operational state as a function thereof, said power system, further comprising:
- another power converter, including:
  - another power switch configured to conduct for a duty cycle to provide a regulated output characteristic at an output thereof, and
  - another controller configured to receive another command from said power system controller to enter said another power converter operational state and to provide a signal to control said duty cycle of said another power switch as a function of said output characteristic and in accordance with said another command, thereby regulating an internal operating characteristic of said another power converter to improve an operating efficiency thereof as a function of said another system operational state.

8. The power system as recited in claim 7 wherein at least one of said system operational state and said another system operational state, and said power converter operational state and said another power converter operational state, are different.

9. The power system as recited in claim 7 wherein said power converter and said another power converter are configured to provide power to said load and said another load, respectively.

10. The power system as recited in claim 7 wherein said power system controller is configured to sequentially operate said power converter and said another power converter.

11. The power system as recited in claim 6 wherein said power converter is configured to enter said power converter operational state within a transition time from another power converter operational state.

12. The power system as recited in claim 6 wherein said power system controller is configured to receive a signal indicating a power converter status of said power converter, said power converter operational state being a function of said power converter status.

13. The power system as recited in claim 12 wherein said power converter status is selected from the group consisting of:
- a fully operational status,
- a failure likely status,
- a failed status, and
- an overloaded status.

14. The power system as recited in claim 6 wherein said load includes a processor and said system operational state depends on one of a core state and a performance state of said processor.

15. The power system as recited in claim 6 wherein said power converter operational state is selected from the group consisting of:
- a fully operational power converter,
- a reduced redundancy power converter, and
- an idle power converter.

16. A method of operating a power system coupled to a load, comprising:
- receiving a signal indicating a system operational state of said load;
- generating a power converter operational state as a function of said system operational state;
- inducing a power converter to enter said power converter operational state; and
- providing a signal to control a duty cycle of a power switch of said power converter as a function of an output characteristic thereof and in accordance with said power converter operational state, thereby regulating an internal operating characteristic of said power converter to improve an operating efficiency thereof as a function of said system operational state.

17. The method as recited in claim 16 wherein said power system is coupled to another load and further comprising:
- receiving another signal indicating another system operational state of said another load;
- generating another power converter operational state as a function of said another system operational state;
- inducing another power converter to enter said another power converter operational state; and
- providing a signal to control a duty cycle of another power switch of said another power converter as a function of an output characteristic thereof and in accordance with said another power converter operational state, thereby regulating an internal operating characteristic of said another power converter to improve an operating efficiency thereof as a function of said another system operational state.

18. The method as recited in claim 17 wherein said power converter and said another power converter are operated sequentially.

19. The method as recited in claim 16 further comprising receiving a signal indicating a power converter status of said power converter and generating said power converter operational state as a function thereof.

20. The method as recited in claim 16 wherein said power converter operational state is selected from the group consisting of:
- a fully operational power converter,
- a reduced redundancy power converter, and
- an idle power converter.

* * * * *

UNITED STATES PATENT AND TRADEMARK OFFICE
CERTIFICATE OF CORRECTION

PATENT NO. : 7,675,759 B2  Page 1 of 1
APPLICATION NO. : 11/710276
DATED : March 9, 2010
INVENTOR(S) : Artusi et al.

It is certified that error appears in the above-identified patent and that said Letters Patent is hereby corrected as shown below:

On the Title Page, item (56) References Cited, OTHER PUBLICATIONS, 1st entry, delete "No. 6" and insert --No. 5--.
On the Title Page, item (56) References Cited, U.S. PATENT DOCUMENTS, Page 2, Column 1, 2nd entry, delete "at el." and insert --et al.--.
On the Title Page, item (56) References Cited, OTHER PUBLICATIONS, Page 3, Column 1, 5th entry, delete "Biernackl" and insert --Biernacki--.
On the Title Page, item (56) References Cited, OTHER PUBLICATIONS, Page 3, Column 1, 6th entry, delete "integrated" and insert --Integrated--.
On the Title Page, item (56) References Cited, OTHER PUBLICATIONS, Page 3, Column 2, 2nd entry, delete "I.O.," and insert --I.D.,--.
On the Title Page, item (56) References Cited, OTHER PUBLICATIONS, Page 3, Column 2, 3rd entry, delete "254" and insert --264--.
On the Title Page, item (56) References Cited, OTHER PUBLICATIONS, Page 4, Column 1, 3rd entry, delete "Match" and insert --March--.
In Column 16, line 47, delete "affect" and insert --effect--.

Signed and Sealed this

First Day of June, 2010

David J. Kappos
*Director of the United States Patent and Trademark Office*